(12) United States Patent
Yasuda et al.

(10) Patent No.: US 7,731,294 B2
(45) Date of Patent: Jun. 8, 2010

(54) SEAT

(75) Inventors: Eiichi Yasuda, Owariasahi (JP);
Shun'ichi Doi, Takamatsu (JP);
Kiyokazu Sunami, Tajimi (JP);
Etsunori Fujita, Hiroshima (JP); Yumi Ogura, Hiroshima (JP); Seiji Kawasaki, Hiroshima (JP); Kazuyoshi Chizuka, Hiroshima (JP)

(73) Assignees: Kabushiki Kaisha Toyota Chuo Kenkyusho, Aichi-gun (JP); Delta Tooling Co., Ltd., Hiroshima-shi (JP)

( * ) Notice: Subject to any disclaimer, the term of this patent is extended or adjusted under 35 U.S.C. 154(b) by 576 days.

(21) Appl. No.: 10/526,432

(22) PCT Filed: Sep. 3, 2003

(86) PCT No.: PCT/JP03/11247

§ 371 (c)(1),
(2), (4) Date: Aug. 12, 2005

(87) PCT Pub. No.: WO2004/026080

PCT Pub. Date: Apr. 1, 2004

(65) Prior Publication Data

US 2006/0055225 A1    Mar. 16, 2006

(30) Foreign Application Priority Data

Sep. 3, 2002    (JP) .............................. 2002-258306

(51) Int. Cl.
*B60N 2/54*    (2006.01)

(52) U.S. Cl. .............................. 297/452.56; 297/452.13

(58) Field of Classification Search ............ 297/452.18, 297/284.2, 452.56, 452.63, 452.64, 452.13
See application file for complete search history.

(56) References Cited

U.S. PATENT DOCUMENTS

| 199,535 | A | * | 1/1878 | Granger | .................... 297/452.5 |
| 2,633,184 | A | * | 3/1953 | Karg | .............................. 5/247 |
| 2,893,476 | A | | 7/1959 | Liljengren | |
| 3,117,817 | A | * | 1/1964 | Mednick | ...................... 297/224 |
| 3,273,877 | A | * | 9/1966 | Geller et al. | ................... 267/89 |

(Continued)

FOREIGN PATENT DOCUMENTS

EP    0 548 924 A1    6/1993

(Continued)

*Primary Examiner*—Joseph F Edell
(74) *Attorney, Agent, or Firm*—Oblon, Spivak, McClelland, Maier & Neustadt, L.L.P.

(57) ABSTRACT

At a vehicle seat 10, a cushion material 18 is provided at a frame 14 for a sitting portion of a seat frame 12, such that a seat cushion 20 is formed. An upper cushion member (three-dimensional solid knit fabric) 86, which is a surface layer portion of the cushion material 18, is stretched at the frame 14 for the sitting portion, and is layered on a cloth spring material 18 which is a lower layer portion of the cushion material 18. When the cloth spring material 68 is pressed and flexes downward due to pushing-against force which is based on body weight of a seated person at a time of sitting on the seat cushion 20, at regions of the cloth spring material 68 which are pushed by ischial tuberosities of the seated person, tensile forces of extension coil springs 80, which are forces in the pushing direction, act, and directions of tension of the cushion material 18 are in three dimensions.

21 Claims, 23 Drawing Sheets

U.S. PATENT DOCUMENTS

| | | | |
|---|---|---|---|
| 3,462,196 A * | 8/1969 | Arnold et al. | 297/452.49 |
| 5,013,089 A | 5/1991 | Abu-Isa et al. | |
| 5,044,693 A * | 9/1991 | Yokota | 297/452.18 |
| 5,490,718 A * | 2/1996 | Akizuki et al. | 297/452.49 |
| 6,079,782 A * | 6/2000 | Berg et al. | 297/284.3 |
| 6,302,487 B1 * | 10/2001 | Fujita et al. | 297/452.56 |
| 6,489,000 B1 * | 12/2002 | Ogura et al. | 428/45 |
| 6,854,805 B2 * | 2/2005 | Fujita et al. | 297/452.56 |
| 2001/0043002 A1 * | 11/2001 | Nakane et al. | 297/284.1 |
| 2002/0034901 A1 * | 3/2002 | Fujita et al. | 442/32 |
| 2002/0060493 A1 * | 5/2002 | Nishino et al. | 297/452.56 |
| 2002/0096932 A1 * | 7/2002 | Fujita et al. | 297/452.56 |
| 2003/0006640 A1 | 1/2003 | Yasuda et al. | |
| 2003/0201659 A1 | 10/2003 | Yasuda et al. | |
| 2004/0145230 A1 | 7/2004 | Fujita et al. | |

FOREIGN PATENT DOCUMENTS

| | | |
|---|---|---|
| EP | 1193117 | 4/2002 |
| JP | 151609/1979 | 10/1979 |
| JP | 59-21264 | 2/1984 |
| JP | 42453/1987 | 3/1987 |
| JP | 7161/1993 | 2/1993 |
| JP | 34954/1993 | 5/1993 |

* cited by examiner

SEAT

TECHNICAL FIELD

The present invention relates to a seat, and in particular, to a seat such as a vehicle seat which is installed in a vehicle, or the like.

BACKGROUND ART

There is conventionally known, as a vehicle seat, a vehicle seat having a cushion material formed from polyurethane foam (hereinafter called urethane). As the cushion structure of such a vehicle seat, a structure is widely used in which a cushion material made of urethane is placed on a plate or a spring material, such as a contour mat (trade name) or the like provided at a seat frame or a seat back frame, and these are wrapped in a fabric material.

Therefore, it is known that the shape (the design shape) and the elastic characteristic of the cushion material have a great effect on the body pressure dispersability of the seated person and the vibration absorbability. Further, by structuring the cushion material by layering urethanes which have various characteristics, a cushion material can be obtained which has a spring characteristic (elastic characteristic) which is near the spring characteristic of the muscles of the buttocks or the like of the seated person. However, in such a structure, there are the problems that there is the sensation that the restoring force is insufficient and that the weight is heavy.

Thus, a seat has been conceived of in which, as the cushion material taking the place of urethane, a cushion structure is structured by stretching, over a seat frame, a pair of ground knit fabrics and a two-dimensional knit fabric or a three-dimensional solid knit fabric formed by connecting threads which are disposed between the ground fabrics (see, for example, Japanese Patent No. 5013089). The cushion material formed from this three-dimensional solid knit fabric or two-dimensional fabric is an elastic structure which is difficult to weaken, and is thinner than urethane, and exhibits an elastic characteristic in place of urethane.

However, in a conventional vehicle seat using such a three-dimensional solid knit fabric or two-dimensional fabric as the cushion material, the two-dimensional knit fabric is stretched over the seat frame at a tension such that the elongation is in the range of from 5% to 20%, and the three-dimensional solid knit fabric is stretched at a tension such that the elongation is less than 5%. Therefore, when a person sits down, large forces arise due to tension at the portions where the convex portions of the human body, such as the ischia, the coccyx, the shoulder blades and the like, contact the cushion material (clothes are ignored). Therefore, this becomes a cause of the supporting pressure becoming strong and a sensation that a foreign object exists arising. Further, if this acts over a long time period, there is the problem that pain arises in the muscles at the peripheries of the aforementioned ischia, coccyx, shoulder blades and the like. In particular, the muscles and the blood vessels in the peripheries beneath the ischial tuberosities, which support the majority of the body weight of the human body, are compressed, and there are cases in which pain or numbness due to interruption in blood circulation arises.

Further, in the above-described conventional seat, the two-dimensional knit fabric is stretched directly over the frame. Therefore, the problem is known that it is easy for there to arise a phenomenon, which is the so-called hammock sensation phenomenon, in which it is easy for the seated person to move in the front-rear and left-right directions within the frame, and due to the input of vibration at the time when the vehicle travels for example, the seated posture of the seated person changes or the seated person slides forward on the seat.

DISCLOSURE OF THE INVENTION

Thus, the present invention overcomes the above-described problems as follows.

A seat which is a first aspect of the present invention comprises: a seat frame having a frame for a sitting portion and a frame for a back portion; a planar tension structure attached to the frame for the sitting portion or the frame for the back portion; and an elastic supporting structure supporting the planar tension structure, between the frame for the sitting portion or the frame for the back portion and the planar tension structure, such that directions of tension are in three dimensions.

In the seat which is the first aspect of the present invention, the planar tension structure, which is supported at the frame for the sitting portion via the elastic supporting structure, structures at least a portion of a cushion material of a seat cushion, and the planar tension structure, which is supported at the frame for the back portion via the elastic supporting structure, structures at least a portion of a cushion material of a seat back.

Incidentally, among human bodies (seated persons), individual differences are great, physical abilities and seated postures also differ, and the ways of coping with seating over a long time period also differ. Further, the respective regions of a human body exhibit a three-dimensional configuration and are structured by many parameters, and among these parameters, the individual differences with respect to the dynamic characteristics of the muscles in particular are great. Moreover, at the respective regions of the human body, the respective parameters vary as, for example, the human body swings due to the behavior of the vehicle while traveling. Therefore, in order to stabilize the seated posture while mitigating pain and numbness of the seated person, it is effective to make the compliance of the seat cushion or the seat back conform to (match) the compliance of the human body. Note that compliance is defined as (amount of flexure)/(pressure value).

Here, in the seat which is the first aspect of the present invention, the planar tension structure which is two-dimensional is elastically supported by the elastic supporting structure at least one of the frame for the sitting portion and the frame for the back portion of the seat frame, such that the directions of tension are in three dimensions. In other words, force (pseudo normal line direction force) in a direction intersecting the tensile force in a case of being supported two-dimensionally, is applied to the planar tension structure by the elastic supporting structure.

Therefore, at the seat cushion or the seat back, a human body, which is a three-dimensional pressure applying body, can be supported by pseudo normal line direction force. In addition, because a low tension portion and a high tension portion (tension fields) are generated at the planar tension structure due to the three-dimensional support by the elastic supporting structure, the compliance (elastic characteristic) of that planar tension structure (the seat cushion or the seat back) can be set to conform to the compliance of the human body. Namely, although it suffices for the elastic supporting structure to support the planar tension structure three-dimensionally at the time of sitting, the elastic supporting structure may support the planar tension structure such that the planar tension structure is a three-dimensional configuration before sitting. This tension may be formed of tension which supports the planar tension structure two-dimensionally, and the pseudo normal line direction force which is force in a direction intersecting that tension. Further, the direction of the pseudo normal line direction force may be a direction running along a vertical plane which includes the front-rear direction of the seat.

In this way, the seat which is the first aspect of the present invention can stabilize the seated posture while mitigating pain and numbness of the seated person.

In a seat which is a second aspect of the present invention, in the seat which is the first aspect of the present invention, the elastic supporting structure includes a first elastic member which, at a time of sitting, pulls a rear end of the planar tension structure, whose front end is fixed to the frame for the sitting portion, rearward while moving the rear end forward.

In the seat which is the second aspect of the present invention, the planar tension structure, whose front end is fixed to the frame for the sitting portion, structures at least a portion of the cushion material of the seat cushion. When the planar tension structure flexes downward due to the pressure by the human body at the time of sitting, the rear end of that planar tension structure is, by the first elastic member, pulled rearward while moving forward. Therefore, the tension around the sacral bone of the seated person at the time of sitting is small as compared with a case in which the first elastic member is not provided, and the fitting sensation improves.

Further, due to this decrease in tension, matching of the compliance of the planar tension structure (the seat cushion) and the compliance of the human body is aimed for, and a reduction in pain and numbness around the ischial tuberosities is possible. Moreover, due to this decrease in tension, the absorbability of impact vibrations and vibrations of the entire body of the seated person, which are caused by top-bottom direction vibrations, is improved.

In a seat which is a third aspect of the present invention, in the seat which is the first aspect of the present invention, the elastic supporting structure includes a second elastic member which is provided between the frame for the sitting portion and the planar tension structure, and which, at a time of sitting, pulls downward vicinities of beneath ischial tuberosities of a seated person at the planar tension structure.

In the seat which is the third aspect of the present invention, the planar tension structure structures at least a portion of the cushion material of the seat cushion, and portions, at the planar tension structure, in vicinities of beneath the ischial tuberosities are pulled downward by the second elastic member at least at the time of sitting. Namely, the second elastic member reduces the tension in vicinities of beneath the ischial tuberosities at the planar tension structure, as compared with a case in which the second elastic member is not provided.

Therefore, the support pressure around the pelvis at the planar tension structure (the seat cushion) is in the normal line direction, the shearing force applied to the muscles of the seated person is reduced, the seated person is given the impression of a feeling of uniform support, and dispersion of (the supporting pressure of) the body pressure is aimed for. Further, the portions in vicinities of beneath the ischial tuberosities at the planar tension structure which are pulled downward by the second elastic member, are a structure which is equivalent to a negative spring constant being applied, and the longitudinal spring constant is small. Therefore, not only the force applied to the human body, but also the rate of change of that force (jerking) is decreased. In this way, the absorbability of vibrations is improved even more, and the comfort of the ride also is improved.

In a seat which is a fourth aspect of the present invention, in the seat which is the third aspect of the present invention, the second elastic member pulls the planar tension structure such that maximum flexing at the time of sitting arises rearward of a front-rear direction central portion at the time of sitting.

In the seat which is the fourth aspect of the present invention, due to the second elastic member pulling the planar tension structure downward at the time of sitting, maximum flexing of that planar tension structure arises rearward of the front-rear direction central portion. In this way, the seating posture is stable.

In a seat which is a fifth aspect of the present invention, in the seat which is the first aspect of the present invention, the elastic supporting structure includes a third elastic member which is provided between the frame for the sitting portion and the planar tension structure, and which, at a time of sitting, pulls rearward portions at outer sides of a pelvis of a seated person at a rear end of the planar tension structure.

In the seat which is the fifth aspect of the present invention, the planar tension structure structures at least a portion of the cushion material of the seat cushion, and the portions, which are at the outer sides in the left-right direction of the pelvis at the rear end of the planar tension structure, are pulled rearward by the third elastic member at least at the time of sitting. Namely, the third elastic member increases the front-rear direction tension of the planar tension structure at the outer sides of the pelvis, as compared with a case in which the third elastic member is not provided.

Therefore, the portions supporting the femoral regions of the seated person at the planar tension structure (the seat cushion) are high tension (i.e., highly rigid), the seated person is given the impression of a continuous sensation of supporting pressure, and the unsteady sensation (the so-called hammock sensation phenomenon) of that seated person is suppressed.

In a seat which is a sixth aspect of the present invention, in the seat which is the first aspect of the present invention, the elastic supporting structure is provided between the frame for the sitting portion and the planar tension structure, and, at a time of sitting, urges downward a portion further rearward than a front-rear direction central portion of the planar tension structure, and urges upward a portion further forward than the front-rear direction central portion of the planar tension structure.

In the seat which is the sixth aspect of the present invention, due to the elastic supporting structure, at least at a time of sitting, urging downward a portion further rearward than and urging upward a portion further forward than the front-rear direction central portion of the planar tension structure, the elastic supporting structure supports the planar tension structure such that the directions of tension are in three dimensions.

Therefore, at the rear portion of the planar tension structure, the tension around the sacral bone of the seated person at the time of sitting is small as compared with a case in which the elastic supporting structure is not provided, and the fitting sensation improves. Further, due to this decrease in tension, matching of the compliance of the planar tension structure (the seat cushion) and the compliance of the human body is aimed for, and a reduction in pain and numbness around the ischial tuberosities is possible. Moreover, due to this decrease in tension, the absorbability of impact vibrations and vibrations of the entire body of the seated person, which are caused by top-bottom direction vibrations, is improved.

On the other hand, at the front portion of the planar tension structure, because the tension is high and the supporting pressure also is high, the compliance of the planar tension structure (the seat cushion) even better matches the compliance of the human body. In particular, because the rear portion at the planar tension structure, which corresponds to the buttocks of the seated person, flexes downward easily and it is hard for the front portion to flex upward, forward sliding of the seated person is prevented, and the seated posture is stable.

In a seat which is a seventh aspect of the present invention, in the seat which is the first aspect of the present invention, the planar tension structure is attached to the frame for the back portion, and the elastic supporting structure pulls forward one end portion of the planar tension structure and pulls rearward another end portion of the planar tension structure, at different positions with respect to a heightwise direction.

In the seat which is the seventh aspect of the present invention, at the planar tension structure, tension fields in three dimensions are generated by the elastic supporting structure. In this way, the planar rigidity of the planar tension structure can be made to be high, and the support load at the time of sitting can be dispersed by continuously changing the spring constant in the pushing direction of the planar tension structure, in the heightwise direction and in accordance with the distribution of the mass of the upper half of the seated person.

In a seat which is an eighth aspect of the present invention, in the seat which is the seventh aspect of the present invention, the planar tension structure is structured so as to make integral a three-dimensional tension structure of a front surface side and a two-dimensional tension structure of a rear surface side, at least at a substantially central portion in a left-right direction, and the elastic supporting structure pulls forward one end portion of the two-dimensional tension structure, and pulls rearward another end portion of the three-dimensional tension structure.

In a seat which is a ninth aspect of the present invention, the seat which is the seventh aspect of the present invention further includes a supporting plate disposed so as to be able to rotate rearward, at a position substantially corresponding to a pelvis of a seated person; and a tension adjusting mechanism mitigating top-bottom direction tension of the planar tension structure, in accordance with an amount of movement when the supporting plate is rotated rearward.

In the seat which is the ninth aspect of the present invention, when the supporting plate rotates, in accordance with the amount of movement thereof, the tension of the planar tension structure decreases. Therefore, even in a case in which impact is inputted to the seat back, because the planar tension structure loosens and the force pushing-out the seat back forward is lessened, a great impact absorbing effect can be obtained.

A seat which is a tenth aspect of the present invention comprises: a seat frame having a frame for a sitting portion and a frame for a back portion; a cushion material including a three-dimensional solid knit fabric stretched at the frame for the sitting portion or the frame for the back portion; and a tension adjusting mechanism adjusting tension such that force in a pushing direction arises at a region of the cushion material that a specific region of a human body pushes at a time of sitting.

In the seat which is the tenth aspect of the present invention, a cushion material which includes a three-dimensional solid knit fabric (including a case in which the cushion material is only a three-dimensional solid knit fabric) is stretched at least one of the frame for the sitting portion and the frame for the back portion. The cushion material, which is stretched at the frame for the sitting portion, structures the seat cushion which supports the seated person from the buttocks to the femoral regions, and the cushion material which is stretched at the frame for the back portion structures the seat back which supports the upper body of the seated person. Further, when a person sits down, the cushion material stretched at the frame for the sitting portion or the frame for the back portion supports the seated person while flexing due to pushing-against force which is based on the body weight of the seated person.

Here, at the cushion material, due to the tension being adjusted by the tension adjusting mechanism, force in the pushing direction is applied to the region (hereinafter called the predetermined region) which a specific region of the human body pushes at the time of sitting (the directions of tension thereof are in three-dimensions). In other words, the cushion material is a structure which is equivalent to a negative spring constant being applied to the predetermined region. Therefore, the spring constant in the direction of pushing by the human body at the predetermined region (the planar rigidity at the predetermined region) is small. Thus, the reaction force around the specific region of the human body (the supporting pressure by the cushion material) decreases, and pain and numbness in a vicinity of the specific region of the seated person decreases. Further, when the spring constant is small as described above, the resonance frequency of the cushion material in the aforementioned pushing direction, which is determined mainly by that spring constant and the body weight of the seated person, is low, the high frequency vibrations transmitted to the seated person markedly decrease, and the comfort of the ride improves.

On the other hand, if the tension adjusting mechanism is set so as to make high the tension (planar rigidity) of the portions other than the predetermined region at the cushion material at the time of sitting (portions corresponding to regions of the human body at which it is difficult for pain to be caused), stabilizing of the seated posture can be aimed for while pain and the like of the seated person are reduced as described above. Namely, the cushion material generates tension fields conforming to the shape of a human body which is locally high tension, and the so-called hammock sensation phenomenon can be suppressed.

In this way, the seat which is the tenth aspect of the present invention can stabilize the seated posture while mitigating pain and numbness of the seated person. Namely, matching of the compliance of the cushion material (the seat cushion or the seat back) and the compliance of the human body can be aimed for. Note that it suffices for the force in the pushing direction, which is applied to the predetermined region of the cushion material by the aforementioned tension adjusting mechanism, to be applied at the time of sitting, but may be applied in advance before sitting.

In a seat which is an eleventh aspect of the present invention, in the seat which is the tenth aspect of the present invention, the tension adjusting mechanism is structured by a connecting member which connects the seat frame and a portion of the cushion material corresponding to the region that the specific region of the human body pushes, and which functions as an elastic member which generates tensile force at the time of sitting.

In the seat which is the eleventh aspect of the present invention, the tension adjusting mechanism is structured by the connecting member which connects the seat frame and a portion of the cushion material corresponding to the region that the specific region of a human body pushes. At the time of sitting, due to the elasticity thereof, the connecting member applies tensile force in that pushing direction to the aforementioned predetermined region of the cushion material. At this time, the connecting member may function as an elastic member for example, and may also function as a damping member or the like.

In this way, because the tension adjusting mechanism is structured merely by connecting the frame and the cushion material by the connecting member, the spring constant in the aforementioned pushing direction and the tension fields can be easily set to desired characteristics in accordance with, for example, the elastic characteristic, the number, the arrangement, and the like of the connecting member. Further, as compared with a structure which reduces pain or the like of the seated person by the shape or the elastic characteristic or the like of the cushion material itself, the desired spring constant and tension fields corresponding to the specifications or the like of the seat can be easily obtained, and therefore, the development cost also can be reduced.

In a seat which is a twelfth aspect of the present invention, in the seat which is the eleventh aspect of the present invention, an urging member is provided which urges, in a direction opposite to the pushing direction by the human body at the time of sitting, a region at the cushion material which region is other than a region which is pulled by the connecting member.

In the seat which is the twelfth aspect of the present invention, at the time of sitting, the region at the cushion material, which is other than the region which is pulled by the connecting member, is urged by the urging member in the direction opposite to the direction of pushing by the human body. Therefore, at the cushion material, tension fields which conform even more to the shape of the human body are generated (the compliance of the cushion material is made to match the compliance of the human body even more), and the so-called hammock sensation phenomenon can be suppressed even more.

In a seat which is a thirteenth aspect of the present invention, in the seat which is the twelfth aspect of the present invention, the urging member is structured by a compression spring which is disposed beneath the cushion material at the frame for the sitting portion or rearward of the cushion material at the frame for the back portion.

In the seat which is the thirteenth aspect of the present invention, the urging member is structured by a compression spring which is merely disposed beneath the cushion material at the frame for the sitting portion or rearward of the cushion material at the frame for the back portion. Therefore, the structure is simple, and setting for making the tension fields of the cushion material conform to the shape of the human body is easy.

In a seat which is a fourteenth aspect of the present invention, in the seat which is the twelfth aspect of the present invention, the urging member is structured by an extension spring which connects the frame for the sitting portion or the frame for the back portion and the cushion material.

In the seat which is the fourteenth aspect of the present invention, the urging member is structured by a tension spring which merely connects the frame for the sitting portion or the frame for the back portion and the cushion material. Therefore, the structure is simple, and setting for making the tension fields of the cushion material conform to the shape of the human body is easy.

A seat which is a fifteenth aspect of the present invention comprises: a frame for a sitting portion; a cushion material including a lower layer portion stretched in a front-rear direction at the frame for the sitting portion, and a surface layer portion layered on the lower layer portion and stretched at the frame for the sitting portion; and a tension adjusting mechanism connecting connection positions at the lower layer portion in vicinities of beneath ischial tuberosities of a seated person and portions at the frame for the sitting portion which portions are lower than the connection positions, and generating tensile force at a time of sitting.

In the seat which is the fifteenth aspect of the present invention, the seat cushion (sitting portion) is structured by the lower layer portion of the cushion material being stretched in the front-rear direction at the frame for the sitting portion, and the surface layer portion, which is layered on the lower layer portion, being stretched at the frame for the sitting portion.

Further, because the connection positions of the lower layer portion are in vicinities of beneath the ischial tuberosities of the seated person, the longitudinal spring constant in the vicinities of beneath the ischial tuberosities at (the lower layer portion of) the cushion material is small, and the reaction force around beneath the ischial tuberosities (the supporting pressure by the cushion material) decreases. In this way, pain or numbness around beneath the ischial tuberosities of the seated person is decreased. Moreover, due to the decrease in the longitudinal spring constant, the resonance frequency of the cushion material in the top-bottom direction, which is determined mainly by that longitudinal spring constant and the body weight of the seated person, is low, the high frequency vibrations transmitted to the seated person markedly decrease, and the comfort of the ride improves.

On the other hand, because the tensile force of the tension adjusting mechanism is applied as front-rear direction tension in the surface direction of the lower layer portion which flexes due to sitting, the planar rigidity of regions at the cushion material, which pass through vicinities of beneath the ischial tuberosities and which run along the front-rear direction except for vicinities of beneath the ischial tuberosities where the aforementioned longitudinal spring constant is reduced, is high. In this way, tension fields conforming to the shape of the human body are generated at the cushion material, and it is possible to suppress the so-called hammock sensation phenomenon and aim for stabilization of the seated posture while reducing pain and the like of the seated person.

Moreover, in the present seat, the longitudinal spring constant and the tension fields at the cushion material can be easily set to desired characteristics by the elastic characteristic, the arrangement, and the like of the tension adjusting mechanism which connects the lower layer portion and the frame for the sitting portion. Therefore, by the simple combination of the elastic elements and damping elements and the like which structure the tension adjusting mechanism, the tension is adjusted, and the desired longitudinal spring constant and tension fields can be obtained, and the development cost is reduced as compared with a structure in which the tension is adjusted by the shape or the structure of the cushion (the shape of a cushion made of a polyurethane foam, the stitch structure of a three-dimensional solid knit fabric, or the like).

In this way, the seat which is the fifteenth aspect of the present invention can stabilize the seated posture while mitigating pain and numbness of the seated person. Namely, matching of the compliance of the cushion material (the seat cushion) and the compliance of the human body can be aimed for. Note that it suffices for the tensile force, which is applied to the connection position of the lower layer portion by the aforementioned tension adjusting mechanism, to be applied at the time of sitting, but may be applied in advance before sitting.

A seat which is a sixteenth aspect of the present invention comprises: a frame for a back portion; a cushion material including a lower layer portion stretched at the frame for the back portion at a portion corresponding to a region between a lower side of shoulder blades and a lumbar vertebrae region of a seated person, and a surface layer portion layered on the lower layer portion and stretched at the frame for the back portion; and a tension adjusting mechanism connecting at least one connection position at the lower layer portion among a connection position further upward than beneath the shoulder blades and a connection position further downward than the lumbar vertebrae region, and the frame for the back portion, and generating tensile force which pulls the lower layer portion rearward at a time of sitting.

In the seat which is the sixteenth aspect of the present invention, the seat back (back portion) is structured by the lower layer portion of the cushion material being stretched at the frame for the back portion at the portion corresponding to the region between beneath the shoulder blades and the lumbar vertebrae region of the seated person, and the surface layer portion, which is layered on the lower layer portion, being stretched at the frame for the back portion.

When a person sits down on this seat, due to the pushing-against force by the upper body of that seated person, the surface layer portion and the lower layer portion flex downward. At this time, the tension adjusting mechanism, which connects the connection position of the lower layer portion and the frame for the sitting portion, generates tensile force pulling the lower layer portion rearward, and pulls the connection position of the lower layer portion rearward (the directions of tension of the lower layer portion are in three dimensions). In this way, because it is a structure which is equivalent to a negative spring constant being applied to the connection position at the lower layer portion of the cushion material, in a vicinity of that connection position at the lower layer portion, the spring constant mainly in the front-rear direction (the planar rigidity at the connection position in the direction of pushing by the human body) is small.

Further, the connection position of the lower layer portion is one of or both of (preferably both of) further upward than beneath the shoulder blades of the seated person and further downward than the lumber vertebrae region. Therefore, the aforementioned spring constant at the cushion material in a vicinity of further upward than beneath the shoulder blades and further downward than the lumber vertebrae region (the buttocks) is small, and the reaction force (the supporting force by the cushion material) around the shoulder blades or the buttocks is reduced. In this way, pain or numbness in a vicinity of the shoulder blades or a vicinity of the buttocks of the seated person is lessened.

On the other hand, at the region between the lumbar vertebrae region and beneath the shoulder blades of the seated person, which region is at the lower layer portion and is stretched at the frame for the back portion, the planar rigidity is higher than at further upward than beneath the shoulder blades or further downward than the lumbar vertebrae region, due to the tension which accompanies the sitting. In this way, tension fields conforming to the shape of the human body are generated at the cushion material, and the so-called hammock sensation phenomenon can be suppressed and stabilization of the seated posture can be aimed for, while pain and the like of the seated person are lessened.

Further, in the present seat, the spring constant and the tension fields at the cushion material can be easily set to desired characteristics by the elastic characteristic, the number, the arrangement, and the like of the tension adjusting mechanism. Therefore, by the simple combination of the elastic elements and damping elements and the like which structure the tension adjusting mechanism, the tension is adjusted, and the desired spring constant and tension fields can be obtained, and the development cost is reduced as compared with a structure in which the tension is adjusted by the shape or the structure of the cushion (the shape of a cushion made of a polyurethane foam, the stitch structure of a three-dimensional solid knit fabric, or the like).

In this way, the seat which is the sixteenth aspect of the present invention can stabilize the seated posture while mitigating pain and numbness of the seated person. Namely, matching of the compliance of the cushion material (the seat back) and the compliance of the human body can be aimed for. Note that it suffices for the tensile force, which is applied to the connection position of the lower layer portion by the aforementioned tension adjusting mechanism, to be applied at the time of sitting, but may be applied in advance before sitting.

Moreover, a seat which is a seventeenth aspect of the present invention comprises: a seat frame having a fixed frame, and a movable frame provided at a rear portion of the fixed frame so as to be able to move in a front-rear direction; a cushion material having a cloth spring material whose front end portion is anchored at the fixed frame and whose rear end portion is anchored at the movable frame, and a surface layer portion layered on the cloth spring material and stretched at the fixed frame; an urging member provided between the fixed frame and the movable frame, and, at a time of sitting, urging the movable frame rearward and adding tension to the cloth spring material; and a tension adjusting mechanism connecting connection positions which are at the cloth spring material and are in vicinities of beneath ischial tuberosities of a seated person and are further outward and rearward than beneath the ischial tuberosities, and portions at the fixed frame which portions are further rearward and downward than the connection positions, the tension adjusting mechanism generating tensile force at the time of sitting.

In the seat which is the seventeenth aspect of the present invention, the seat cushion (sitting portion) is formed by the cloth spring material spanning between the fixed frame and the movable frame, and the surface layer portion, which is stretched at the fixed frame, being layered on the cloth spring material. Namely, the cloth spring material structures the lower layer portion of the cushion material. When a person sits on this seat cushion and the surface layer portion and the cloth spring material flex downward, the movable frame moves forward while resisting the urging force of the urging member, and this urging force is applied to the cloth spring material as tension (e.g., tension over substantially the entire surface). In this way, owing to the thin cloth spring material and the urging member, a good flexing sensation is obtained, and it is possible to make the seat be more compact (thinner) and lighter weight.

Here, because the connection positions of the cloth spring material and the portions of the fixed frame, which portions are positioned further downward and rearward than those connection positions, are connected by the tension adjusting mechanism, the cloth spring member, which flexes downward while the rear end portion thereof is moved forward by the movable frame at the time of sitting, is pulled rearward and downward by the tensile force of the tension adjusting mechanism at the connection positions which are further outward and rearward than beneath the ischial tuberosities of the seated person (the directions of tension of the cloth spring material are in three dimensions).

Among the tensile force of the tension adjusting mechanism, mainly the component which is directed rearward is applied to the cloth spring material as local tension in the front-rear direction, and the planar rigidity of the front-rear, left-right direction regions of the cloth spring material (the cushion material) which pass through the vicinities beneath the ischial tuberosities is high, and tension fields conforming to the shape of the human body are generated. On the other hand, among the tensile force of the tension adjusting mechanism, mainly the component which is directed downward pulls the connection positions of the cloth spring material downward, in other words, applies a negative spring constant to the connection positions, and lowers the longitudinal spring constant in vicinities of those connection positions (the planar rigidity in the direction of pushing by the human body at the connection positions).

Further, because the connection positions of the cloth spring material are in vicinities of beneath the ischial tuberosities of the seated person, the longitudinal spring constant is reduced beneath those ischial tuberosities, and the reaction force (the supporting pressure by the cushion material) beneath the ischial tuberosities of the seated person is reduced. In this way, the seated person is properly supported by highly rigid surfaces at the cushion material and the seated posture is stable, while pain and numbness around beneath the ischial tuberosities of the seated person are lessened. Namely, in the present seat, the so-called hammock sensation phenomenon is suppressed.

Moreover, because the longitudinal spring constant in vicinities of beneath the ischial tuberosities at the cloth spring material (the cushion material) is small as described above, the resonance frequency of the cushion material in the top-bottom direction, which is determined mainly by that longitudinal spring constant and the body weight of the seated person, is low, the high frequency vibrations transmitted to the seated person markedly decrease, and the comfort of the ride improves. Further, because the cloth spring material is pulled, at the connection positions thereof, rearward and downward by the tension adjusting mechanism, as compared with a structure in which the tension adjusting mechanism is not provided, the region where the downward flexure thereof is a maximum moves rearward, and forward sliding of the seated person is reliably prevented.

In addition, in the present seat, the longitudinal spring constant at the cushion material can be easily set to the desired characteristic by the elastic characteristic, the number, the arrangement, and the like of the tension adjusting mechanism which connects the cloth spring material and the fixed frame. Therefore, by the simple combination of the elastic elements and damping elements and the like which structure the tension adjusting mechanism, the tension is adjusted, and the desired longitudinal spring constant can be obtained, and the development cost is reduced as compared with a structure in which the tension is adjusted by the shape or the structure of the cushion (the shape of a cushion made of a polyurethane foam, the stitch structure of a three-dimensional solid knit fabric, or the like).

In this way, the seat which is the seventeenth aspect of the present invention can stabilize the seated posture while mitigating pain and numbness of the seated person. Namely, matching of the compliance of the cushion material (the seat cushion) and the compliance of the human body can be aimed for. Note that it suffices for the tensile force, which is applied to the connection positions of the cloth spring material by the aforementioned tension adjusting mechanism, to be applied at the time of sitting, but may be applied in advance before sitting.

In a seat which is an eighteenth aspect of the present invention, in the seat which is the seventeenth aspect of the present invention, a pushing member, which pushes the cloth spring material from a lower side at the time of sitting, is provided further forward than a front-rear direction central portion of the cloth spring material.

In the seat which is the eighteenth aspect of the present invention, at the time of sitting, the pushing member pushes, from beneath, the cloth spring material at a region which is further forward than the front-rear direction central portion of the cloth spring material. Therefore, tension based on this pushing force is applied to the cloth spring material, and at the region further forward than the buttocks of the seated person, the supporting pressure of the portion which rises from the region of maximum downward flexure of the cloth spring material is high. Thus, this rising-up portion where the supporting pressure is high functions as a dam, and even more reliably prevents forward sliding of the seated person. Namely, the pushing member has a tension adjusting function which is separate from the tension adjusting mechanism which is the seventeenth aspect of the present invention.

In a seat which is a nineteenth aspect of the present invention, in the seat which is the eighteenth aspect of the present invention, the pushing member includes a pushing plate which is formed in a rectangular shape of a width of substantially 100 mm and is disposed in a left-right direction of the seat and whose rear end portion is positioned from 250 mm to 350 mm forward of the connection positions, and an elastic member which is provided between the pushing plate and the fixed frame.

In the seat which is the nineteenth aspect of the present invention, due to the elastic member being pushed downward via the pushing plate accompanying sitting, the pushing member pushes the cloth spring material from the lower side by the elastic force of that elastic member.

Here, because the pushing plate, whose width is substantially 100 mm, is disposed such that the rear end portion thereof is positioned 250 mm to 350 mm further forward than the connection position of the tension adjusting mechanism to the cloth spring member, a dam is formed in a proper range from the buttocks to the femoral regions of the seated person. In this way, forward sliding of the seated person can be prevented even more reliably. Note that it suffices to appropriately set the rear end position of the pushing plate within the range of 250 mm to 350 mm from the connection position, in accordance with the seating angle or the like.

In a seat which is a twentieth aspect of the present invention, in the seat which is any one of the fifteenth through seventeenth aspects of the present invention, at the surface layer portion, portions between a left-right direction central portion which supports the seated person and left-right direction both end portions, elongate in a left-right direction more easily than the central portion and the both end portions.

In the seat which is the twentieth aspect of the present invention, at the surface layer portion, which is layered on the lower layer portion or the cloth spring material (hereinafter called lower layer portion) and which is stretched at the frame for the sitting portion or the frame for the back portion, due to the portions between the aforementioned central portion and both end portions elongating in the left-right direction at the time of sitting, they flex the lower layer portion is downwardly or rearwardly while flexing downwardly or rearwardly.

Here, the surface layer portion is structured such that the portions between the left-right direction central portion and the left-right direction both end portions elongate in the left-right direction more easily than the central portion and the both end portions. Therefore, at the time of sitting, they elongate and flex in the left-right direction and flex the lower layer portion, while maintaining high the tension (planar rigidity)

of the left-right direction central portion at the cushion material which supports the seated person. In this way, while the aforementioned function of reducing the spring constant is maintained, tension fields which conform even more to the shape of the human body are generated at the cushion material, and the seated posture can be stabilized even more while lessening pain and numbness of the seated person.

In a seat which is a twenty-first aspect of the present invention, in the seat which is the twentieth aspect of the present invention, the portions between the left-right direction central portion and the left-right direction both end portions include elastic members which elongate more easily than the central portion and the both end portions.

In the seat which is the twenty-first aspect of the present invention, the cushion material has, at the portions between the left-right direction central portion and the left-right direction both end portions, elastic members which elongate more easily in the left-right direction than the central portion and the both end portions. Therefore, with a simple structure, the aforementioned function of generating tension fields which conform even more to the shape of the human body is realized.

In a seat which is a twenty-second aspect of the present invention, in the seat which is the twenty-first aspect of the present invention, the elastic members include a three-dimensional solid knit fabric.

In the seat which is the twenty-second aspect of the present invention, the elastic members, which are disposed between the left-right direction central portion and both end portions of the cushion material, are structured by a three-dimensional solid knit fabric. Therefore, the elastic characteristics of the elastic members can be set in accordance with the stitch structure of that three-dimensional solid knit fabric. Further, it is possible to simplify the structure of the cushion material by making (a portion which is stretched in the left-right direction and which structures at least a portion of) the cushion material be a three-dimensional solid knit fabric on the whole, and by layering and fixing a material, which is harder to elongate than the three-dimensional solid knit fabric, on the obverse surface or the reverse surface of the left-right direction central portion and both end portions.

In a seat which is a twenty-third aspect of the present invention, in the seat which is the twenty-first aspect of the present invention, left-right direction widths of the elastic members vary continuously along a front-rear direction of the frame for the sitting portion or a top-bottom direction of the frame for the back portion.

In the seat which is the twenty-third aspect of the present invention, in the structure in which the cushion material is stretched at the frame for the sitting portion, the widths of the elastic members vary continuously along the front-rear direction of that frame for the sitting portion, and in the structure in which the cushion material is stretched at the frame for the back portion, the widths of the elastic members vary continuously along the top-bottom direction of that frame for the back portion.

Therefore, the left-right direction elongation amounts of the cushion material are different with respect to the front-rear direction of the seat cushion or the top-bottom direction of the seat back, and tension fields which conform even more to the shape of the human body can be generated.

BEST MODE FOR IMPLEMENTING THE INVENTION

A vehicle seat 10, which serves as a seat relating to an embodiment of the present invention, will be described on the basis of FIGS. 1 through 24. Note that arrow UP, arrow LO, arrow FR, arrow RE, arrow RI and arrow LE shown appropriately in the respective drawings respectively denote the front direction (traveling direction), the rear direction, the upward direction, the downward direction, the rightward direction, and the leftward direction, with the traveling direction of the vehicle in which the vehicle seat 10 is installed being the reference. When up, down, front, rear, right, left are to merely be designated hereinafter, they correspond to the directions of the aforementioned respective arrows.

Figure 1:
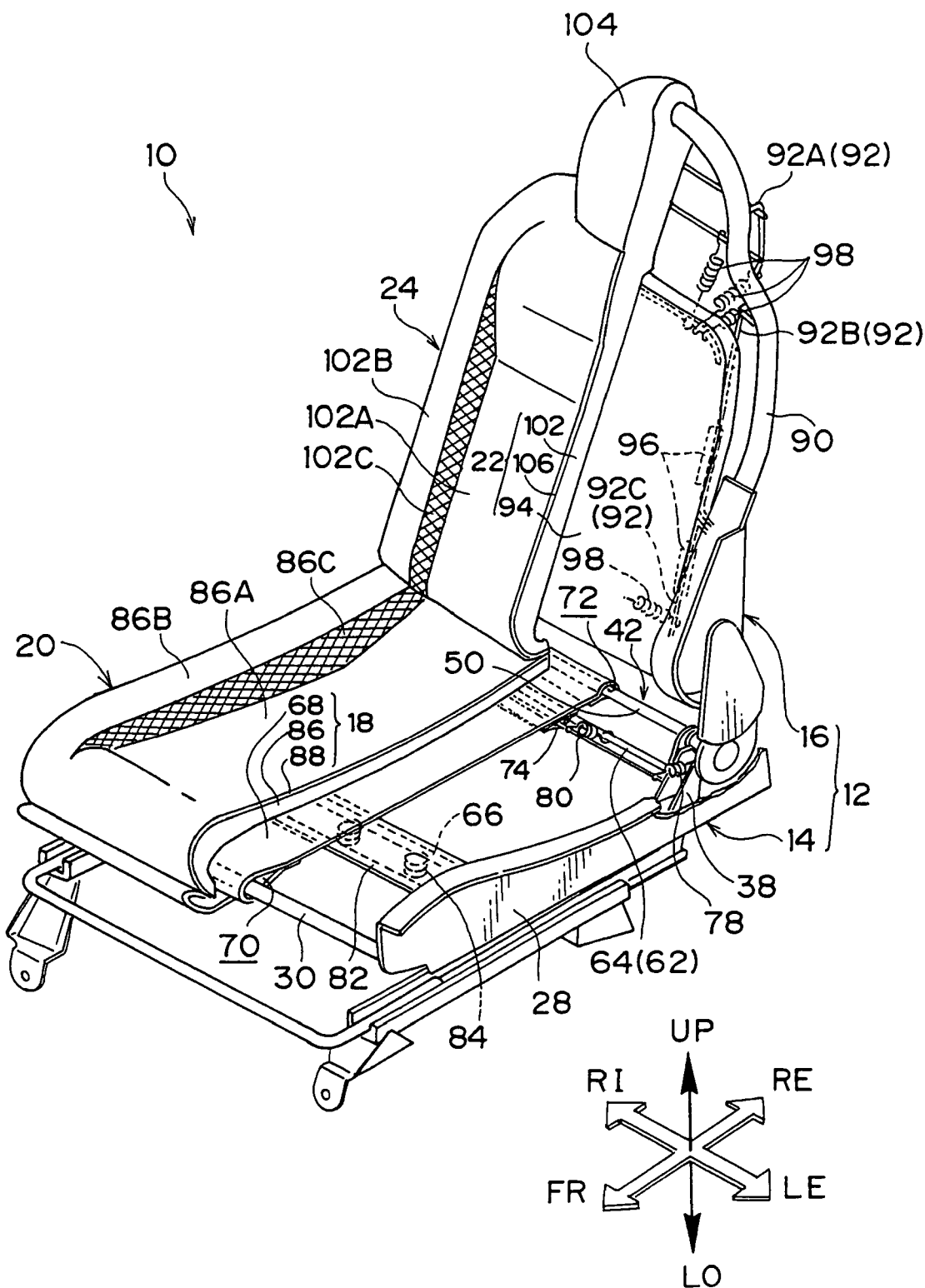
FIG. 1 is a perspective view, a portion of which is cut-away, showing the overall structure of a vehicle seat relating to an embodiment of the present invention.
Figure 2:
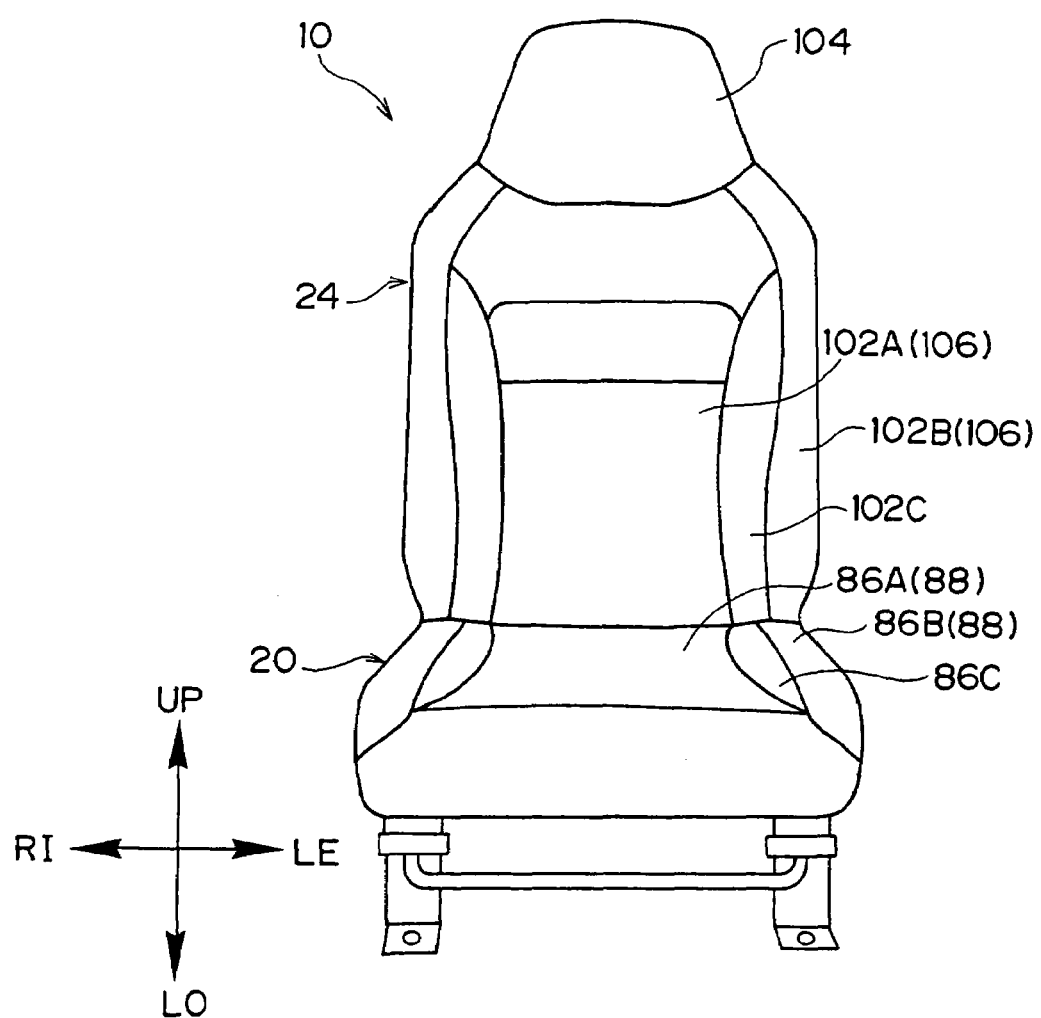
FIG. 2 is a front view of the vehicle seat relating to the embodiment of the present invention.

In FIG. 1, the overall structure of the vehicle seat 10 is shown in a perspective view, a portion of which is cut away. A front view of the vehicle seat 10 is shown in FIG. 2. As shown in these drawings, the vehicle seat 10 has a seat frame 12. The seat frame 12 is structured to have a frame 14 for a sitting portion and a frame 16 for a back portion.

Further, by providing a cushion material 18 for the sitting portion at the frame 14 for the sitting portion, a seat cushion 20 serving as the sitting portion is formed. By providing a cushion material 22 for the back portion at the frame 16 for the back portion, a seat back 24 is formed.

One end (the bottom end) of the frame 16 for the back portion is connected to one end (the rear end) of the frame 14 for the sitting portion, so as to be rotatable around a supporting shaft 26 (see FIG. 3 and FIG. 5) which is disposed along the left-right direction. In this way, a reclining mechanism, which can rotate the seat back 24 in the front-rear direction, is formed. Note that detailed description of the reclining mechanism will be omitted.

First, the structure of the seat cushion 20 and the structure of the seat back 24 will be described. Then, a concrete example of a three-dimensional solid knit fabric 110, which structures a portion of the cushion materials 18, 22, will be described.

(Structure of Seat Cushion)

As shown in FIGS. 3 through 6, the frame 14 for the sitting portion, which structures the seat cushion 20, has a pair of left and right side frames 28 which are respectively long in the front-rear direction. Further, the frame 14 for the sitting portion has frame pipes 30, 32 which are long in the left-right direction. These frame pipes 30, 32 connect the pair of left and right side frames 28 at the front and rear both end portions, respectively. The front end portion of a cloth spring material 68, which will be described later, is anchored on the frame pipe 30 which is positioned at the front end of the frame 14 for the sitting portion.

A base plate 34 is fixed to each of the side frames 28. Each base plate 34 is positioned at the rear portion of the side frame 28 and is also fixed to the frame pipe 32. A long hole 36, which is long along the front-rear, is provided in each base plate 34, and permits front-rear direction sliding while an arm member 44 or an arm member 46, which will be described later, is inserted therethrough.

A supporting leg portion 38 stands erect from the top surface of each base plate 34, further toward the outer side (the side of the side frame 28 to which it is fixed) than the long hole 36, and is for anchoring one end portion of an extension coil spring 78 which will be described later. On the other hand, a shaft-supporting leg portion 40 stands erect from the bottom surface of each base plate 34, and is for shaft-supporting the arm member 44 or the arm member 46.

Each shaft-supporting leg portion 40 is formed in a substantial "U" shape whose lower side is open in plan view. Leg pieces 40B, 40C, which are connected by a connecting portion 40A, face one another in the left-right direction with the long hole 36 therebetween.

Figure 6:
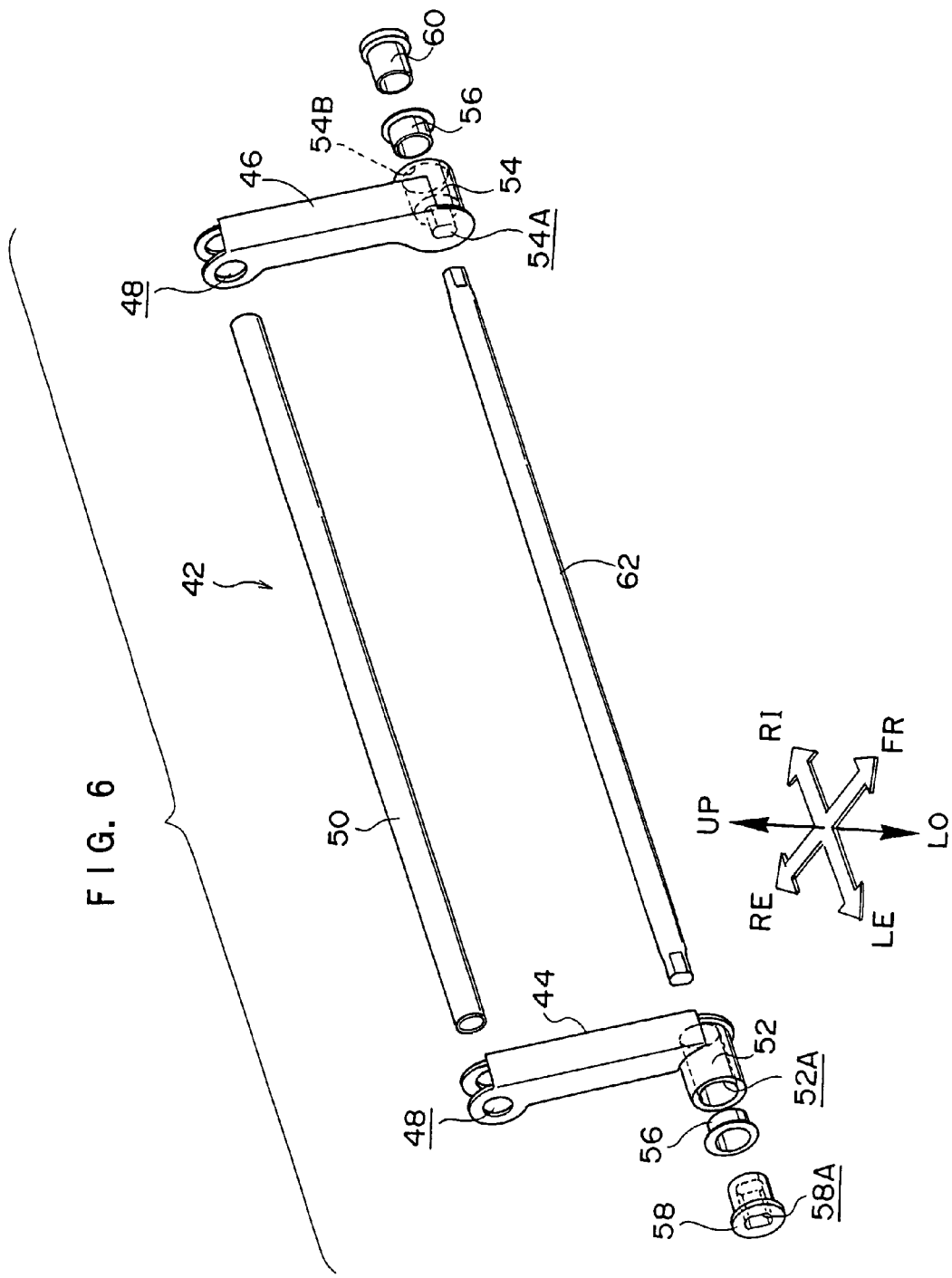
FIG. 6 is an exploded perspective view of a movable frame portion structuring the seat cushion of the vehicle seat relating to the embodiment of the present invention.

Further, the frame 14 for the sitting portion has a movable frame portion 42 which anchors the rear end portion of the cloth spring material 68. As shown in FIG. 6 as well, the movable frame portion 42 has the pair of left and right arm members 44, 46.

Each of the arm members 44, 46 has a fit-together hole 48 provided at one end portion thereof. Different longitudinal direction end portions of a connecting pipe 50 are fit with and fixed to the fit-together holes 48. Namely, the arm members 44, 46 are structured so as to be connected via the connecting pipe 50 while facing one another, and rotate integrally while resisting the torsional load of a torsion bar 62 which will be described later.

The connecting pipe 50 is formed to be shorter than the frame pipe 30 (i.e., the interval between the pair of side frames 28), and the rear end portion of the cloth spring material 68 is anchored thereon.

A boss portion 52 is provided at the other end portion of the arm member 44. A boss portion 54 is provided at the other end portion of the arm member 46. A boss hole 52A, through which the torsion bar 62 which will be described later can be inserted, is provided within the boss portion 52. A fit-together hole 54A, which is formed in a non-circular shape as seen in the axial direction, is provided at the arm member 44 side of the interior of the boss portion 54, and is for holding one end portion of the torsion bar 62.

On the other hand, a boss hole 54B, through which the torsion bar 62 can be inserted, is provided continuously with the fit-together hole 54A, within the boss portion 54 at the side opposite the fit-together hole 54A. Sleeve members 56, which are formed from a low friction material such as resin or the like, are inserted into the boss holes 52A, 54B.

The movable frame portion 42 is shaft-supported by short shaft members 58, 60, which are inserted in the sleeve members 56 in the respective boss holes 52A, 54B and which are fixed and attached to the respectively different shaft-supporting leg portions 40, so as to be able to rotate (swing) around the short shaft members 58, 60 (the boss portions 52, 54).

Concretely, in the state in which the arm members 44, 46 are inserted through the long holes 36 of the respective base plates 34 and the boss portions 52, 54 are positioned between the leg pieces 40B, 40C of the shaft-supporting leg portions 40, the movable frame portion 42 can swing around the short shaft members 58, 60 with respect to a fixed portion of the frame 14 for the sitting portion, due to the short shaft members 58, 60, which are fixed to the leg pieces 40B at the outer sides of the shaft-supporting leg portions 40 and which project within the shaft-supporting leg portions 40, being inserted within the sleeve members 56 within the respective boss holes 52A, 54B.

Further, in this state, the fit-together holes 48 of the arm members 44, 46, i.e., the connecting pipe 50, are positioned further upward than the base plates 34. Note that a fit-together hole 58A, which is formed similarly to the fit-together hole 54A of the boss portion 54, is provided in the short shaft member 58.

In this way, at the movable frame portion 42, the connecting pipe 50 which is positioned above the base plates 34 can rotate (swing) by a predetermined amount in directions of approaching and moving away from the frame pipe 30 (the front-rear direction). The arrangement and dimensions of the respective long holes 36 and the frame pipe 32 are determined such that the long holes 36 and the frame pipe 32 do not interfere with the swinging of the movable frame portion 42.

Figure 7:
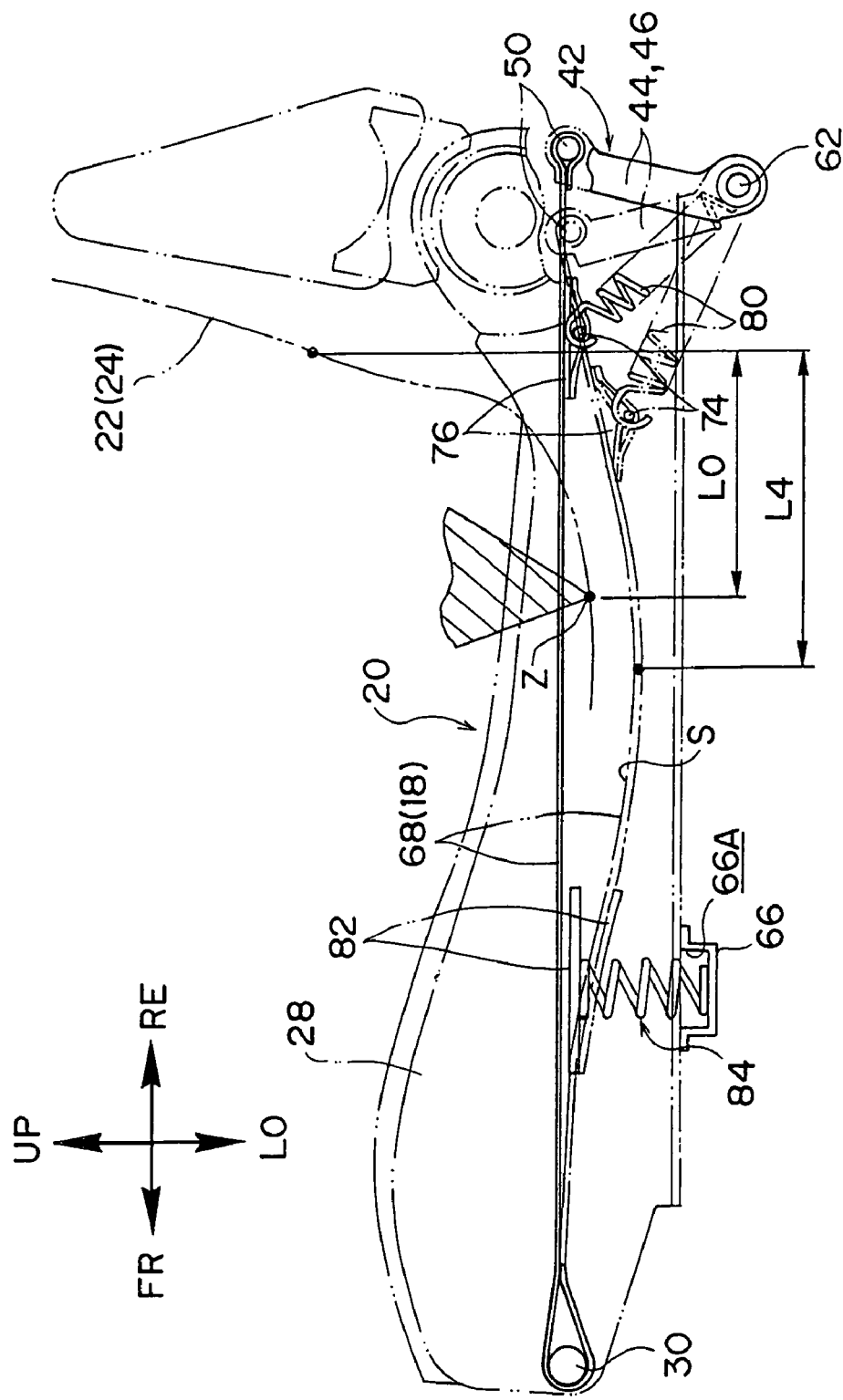
FIG. 7 is a side view showing a stretched state of the cloth spring material structuring the seat cushion of the vehicle seat relating to the embodiment of the present invention.

Note that, as shown by the solid line in FIG. 7, the movable frame portion 42 is disposed such that, at a time of not sitting on the seat cushion 20, the connecting pipe 50 is tilted rearward so as to be furthest away from the frame pipe 30, within the aforementioned predetermined range of rotation. Hereinafter, the position of the movable frame portion 42 at this time will be called the initial position.

Further, as shown in FIG. 6, the torsion bar 62 is provided between the short shaft member 58 and the short shaft member 60 which are fixed to the shaft-supporting leg portions 40. The torsion bar 62 is a solid cylindrical member at which is generated a torsional load which is proportional to the amount of twisting. The both longitudinal direction end portions of the torsion bar 62 are made to be non-circular configurations (detent configurations) in sectional view, in correspondence with the fit-together holes 54A, 58A.

One end portion of the torsion bar 62 is fit-together with the fit-together hole 54A formed in the boss portion 54 of the arm member 46, and rotates integrally with this boss portion 54. On the other hand, the other end portion of the torsion bar 62 is fit-together with the fit-together hole 58A of the short shaft member 58, and is unable to rotate with respect to the frame 14 for the sitting portion. Note that the torsion bar 62 passes through through-holes which are formed in the leg pieces 40C of the respective shaft-supporting leg portions 40. The intermediate portion of the torsion bar 62 is coaxially inserted through and protected within a protective pipe 64 which spans between and is fixed between the left and right leg pieces 40C.

In this way, as shown in FIG. 7, when forward moving force is applied to the connecting pipe 50, the movable frame portion 42 swings forward from the initial position (makes the connecting pipe 50 approach the frame pipe 30), while twisting the torsion bar 62 and resisting the torsional load of the torsion bar 62. Namely, at the frame 14 for the sitting portion, there is the structure that, when the movable frame 42 swings forward, the urging force based on the torsional load (the restoring force with respect to the twisting) of the torsion bar 62 acts on the movable frame portion 42 (as tension on the cloth spring material 68 whose one end portion is anchored on the connecting pipe 50).

Further, when, for example, vibrations accompanying the driving of the vehicle are inputted to the vehicle seat 10, the movable frame portion 42 swings while changing the amount of twisting (load) of the torsion bar 62, and absorbs these vibrations. In order to exhibit this function, the spring constants in the front-rear direction (with respect to the front-rear direction load) of the torsion bar 62 and extension coil springs 80, which will be described later, are set to be different from one another.

Figure 3:
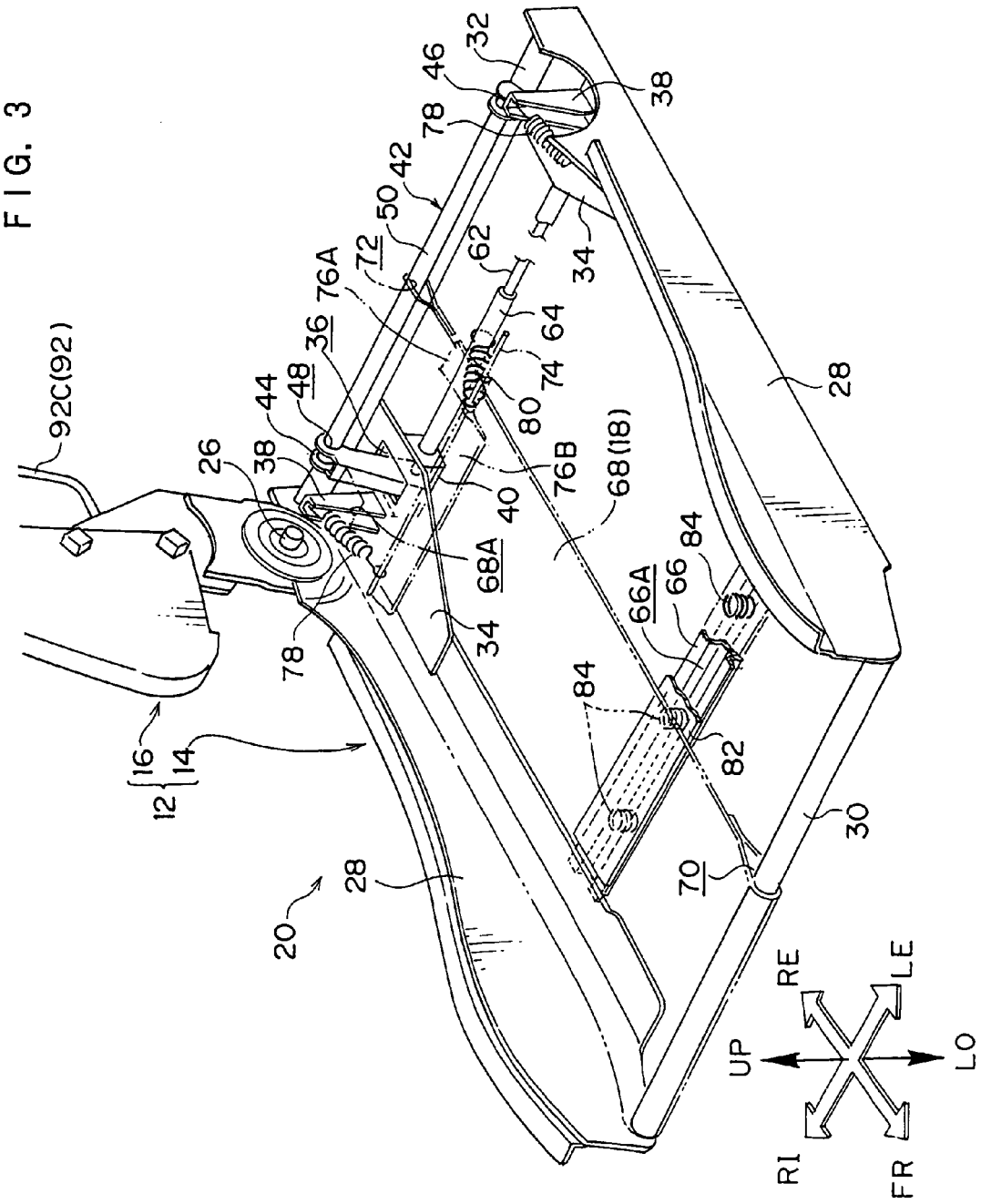
FIG. 3 is a perspective view showing a frame for a sitting portion and a cloth spring material structuring a seat cushion of the vehicle seat relating to the embodiment of the present invention.

Moreover, as shown in FIG. 3, a supporting frame 66, which spans between the pair of left and right side frames 28, is fixed and provided further toward the front side than the front-rear direction central portion of the frame 14 for the sitting portion. The front-rear direction central portion of the supporting frame 66 is a concave portion 66A which is recessed and opens upwardly, and is for supporting the spring loads of compression coil springs 84 which will be described later. The detailed arrangement of the supporting frame 66 will be described later.

As described above, the cushion material 18 is provided at the above-described frame 14 for the sitting portion, so as to structure the seat cushion 20. The cushion material 18 has the cloth spring material 68 which structures the lower layer portion thereof. The cloth spring material 68 is a two-dimensional knit fabric of a mesh (net) structure. Elongation accompanying internal damping due to tension, and restoration due to canceling of that tension, are possible.

Figure 4:
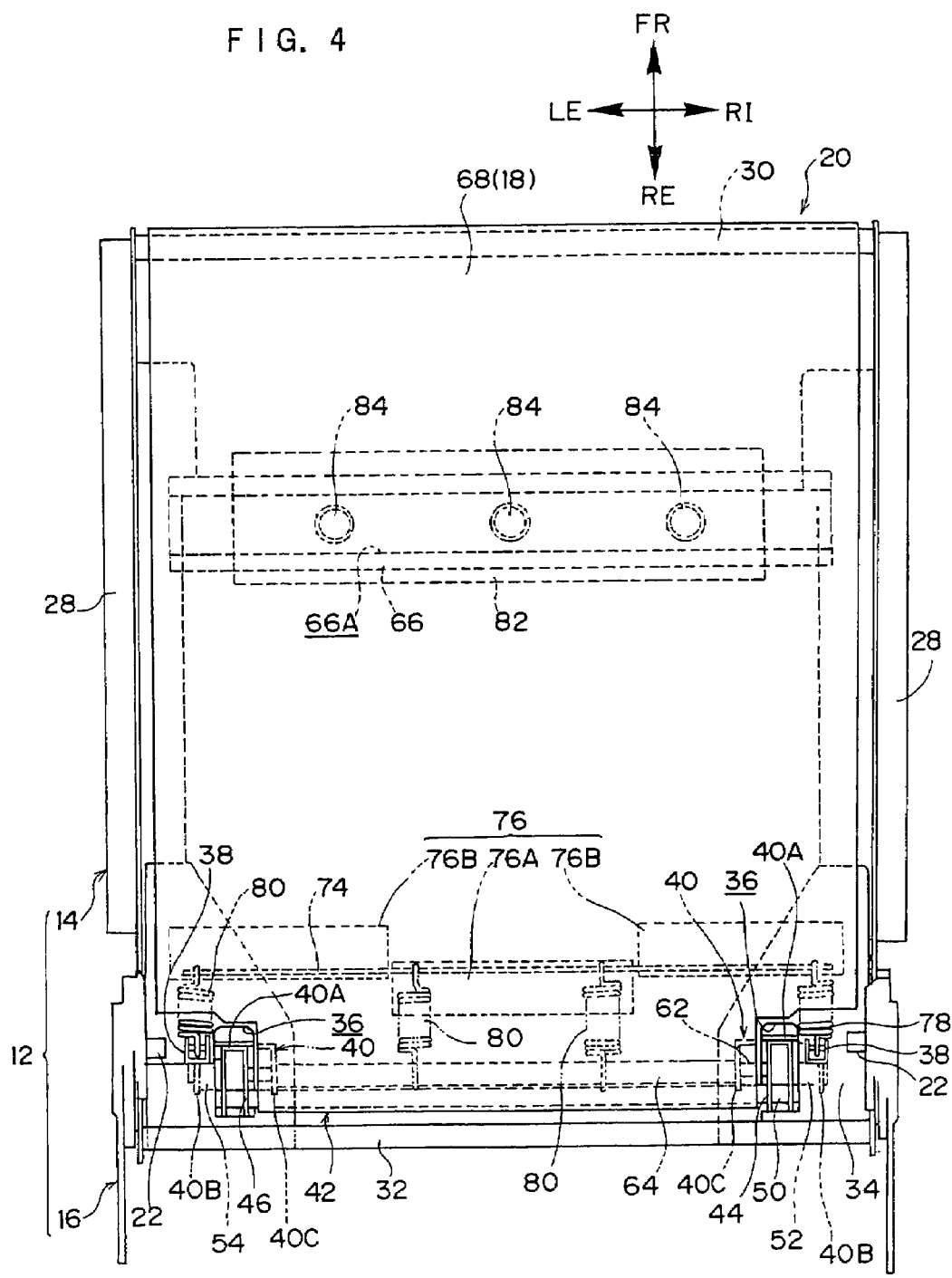
FIG. 4 is a plan view showing the frame for the sitting portion and the cloth spring material structuring the seat cushion of the vehicle seat relating to the embodiment of the present invention.

As shown in a plan view in FIG. 4, in plan view, the cloth spring material 68 is formed as if both left and right corner portions of the rear end are cut-away from a rectangle which substantially corresponds to the frame 14 for the sitting portion. These cut-away portions are cut-away portions 68A. The left-right direction width of the portion of the cloth spring material 68, except for the rear end portion where the cut-away portions 68A are provided, is slightly shorter than the length of the frame pipe 30, and the width between the left and right cut-away portions 68A is slightly shorter than the length of the connecting pipe 50.

The front end portion of the cloth spring material 68 is anchored on the frame pipe 30, and the rear end portion thereof is anchored on the connecting pipe 50. Concretely, one portion of the front end portion of the cloth spring material 68 is folded over (trained around the frame pipe 30), and this folded-over portion is sewed to the portion which is not folded-over, so as to be formed in a substantially annular shape. Due to the frame pipe 30 being inserted through this annular portion 70, the front end portion of the cloth spring material 68 is anchored on the frame pipe 30. On the other hand, one portion of the rear end portion of the cloth spring material 68 is folded over (trained around the connecting pipe 50), and this folded-over portion is sewed to the portion which is not folded-over, so as to be formed in a substantially annular shape. Due to the connecting pipe 50 being inserted through this annular portion 72, the rear end portion of the cloth spring material 68 is anchored on the connecting pipe 50.

The dimensions of the respective portions are determined such that, in this state and when the movable frame portion 42 is positioned at the initial position, the cloth spring material 68 is spread out (provided so as to be stretched weakly) along the horizontal direction. On the other hand, when the cloth spring material 68 flexes downward at the time of sitting on the seat cushion 20, the cloth spring material 68 is supported by the tension which is based on the torsional load of the torsion bar 62, while moving the connecting pipe 50 of the movable frame portion 42 forward. Further, this is a structure in which the tension at this time is small as compared with a case in which the movable frame portion 42 and the torsion bar 62 are not provided (a case in which the other end portion is anchored on a fixed portion of the frame 14 for the sitting portion). Namely, the movable frame portion 42 and the torsion bar 62 exhibit the function of adjusting, in a reducing direction, the tension of the cloth spring material 68 at the time of sitting.

Further, a spring hanging member 74 is provided at the reverse surface (the bottom surface) of the cloth spring material 68 along substantially the entire left-right direction width. The spring hanging member 74 is structured by a steel material which is formed in the shape of a flat plate or a small-diameter solid cylinder which is long in the left-right direction, and is for a sensation that a foreign object exists to not be felt at the time of sitting. The spring hanging member 74 is sewn-in at the cloth spring material 68 further toward the front side than the cutaway portions 68A of the cloth spring material 68.

Concretely, as shown in FIG. 4, in the state in which the spring hanging member 74 is inserted in a bag-shaped material 76 which is formed of a fabric material or the like and is long in the left-right direction and is closed in the front-rear and top-bottom directions, due to the bag-shaped material 76 being sewn to the reverse surface of the cloth spring material 68, the bag-shaped material 76 is attached to the cloth spring material 76. The bag-shaped material 76 is divided into three portions in the longitudinal direction, such that the portion positioned at the longitudinal direction central portion is a bag-shaped material 76A, and the portions positioned at the both end portions are bag-shaped materials 76B.

Figure 5:
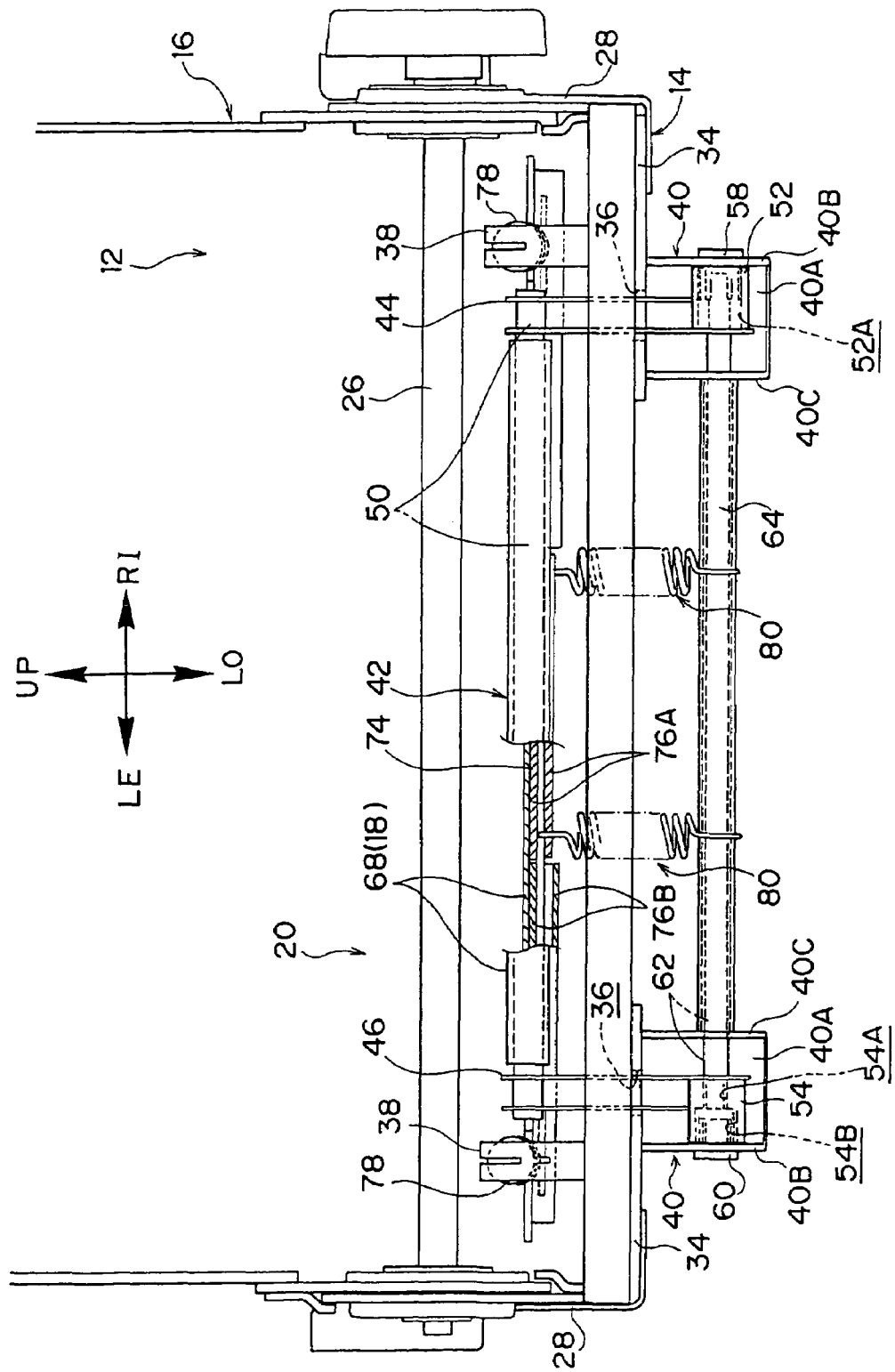
FIG. 5 is a rear view showing the frame for the sitting portion and the cloth spring material structuring the seat cushion of the vehicle seat relating to the embodiment of the present invention.

The bag-shaped material 76A is sewn at the front and rear ends thereof to the reverse surface of the cloth spring material 68, in a state in which the bag-shaped material 76A positions the spring hanging member 74 at the front end portion thereof, and as shown in FIG. 5, is squeezed above and below and nips the spring hanging member 74 in the top-bottom direction. On the other hand, the bag-shaped materials 76B are sewn at the front and rear ends thereof to the reverse surface of the cloth spring material 68, in a state in which the bag-shaped materials 76B position the spring hanging member 74 at the rear end portions thereof and the lower portions thereof are slightly loose and are apart from the spring hanging member 74. The arrangement of the spring hanging member 74 will be described later.

Other end portions of the plural extension coil springs 78, 80, whose one end portions are anchored to the frame 14 for the sitting portion, are anchored on the spring hanging member 74. Concretely, at the longitudinal direction both end portions of the spring hanging member 74 which are positioned forward of the cut-away portions 68A, the other end portions of the extension coil springs 78, whose respective one end portions are anchored to the distal ends of the supporting leg portions 38 of the frame 14 for the sitting portion, are anchored within the bag-shaped materials 76B. Note that the arrangement of the respective extension coil springs 78 will be described later.

Due to the one end portions of the respective extension coil springs 78 being anchored on the distal ends of the supporting leg portions 38 which are positioned slightly further upward than the connecting pipe 50 at the initial position (the rear end portion of the cloth spring material 68), at the time of sitting (at the time when the movable frame portion 42 swings), the extension coil springs 78 add tension to the left-right direction both end portions of the cloth spring material 68.

Namely, at the time of sitting, the extension coil springs 78 have the function of adjusting, in the direction of increasing, the tension in the front-rear direction at the left-right direction both end portions of the cloth spring material 68, in contrast with the movable frame portion 42 and the torsion bar 62 adjusting, in the direction of decreasing, the tension in the front-rear direction at the left-right direction central portion of the cloth spring material 68.

On the other hand, the other end portions of the extension coil springs 80, whose respective one end portions are anchored on the protective pipe 64, are anchored on two places of the spring hanging member 74, which two places are symmetrical with respect to the longitudinal direction central portion and are positioned within the bag-shaped material 76A. Namely, the extension coil springs 80 are disposed so as to be inclined with respect to the top-bottom direction and the front-rear direction respectively, and so as to be substantially orthogonal to the left-right direction (substantially along the front-rear direction as seen in plan view).

The extension coil springs 80 are structured so as to, in the initial state of the movable frame portion 42, be in natural states and not generate urging force in the pulling direction. Further, as shown in FIG. 7, the extension coil springs 80 are structured so as to, when, accompanying sitting, the movable frame portion 42 rotates forward and moves the spring hanging member 74 forward, be pulled by the spring hanging member 74 and generate urging force (tensile force) in directions oriented rearward and downward and corresponding to the angles of inclination thereof. Note that there may be a structure in which the urging forces of the extension coil springs 80 are applied to the cloth spring material 68 before sitting.

The respective extension coil springs 80 exhibit the function of, by their urging forces, adjusting, overall and in the decreasing direction, the tension in the front-rear direction of the cloth spring material 68 by pulling the cloth spring material 68 rearward and downward (the direction of flexing due to sitting). Further, due to mainly the rearward-directed components among the urging forces thereof, the respective extension coil springs 80 add, as partial tension and to the cloth spring material 68, tension in the direction substantially along the front-rear direction (add it to the aforementioned decreasing tension), at the bag-shaped material 76A side end portions of the left and right bag-shaped materials 76B which are positioning the spring hanging member 74 at the rear end portions thereof (i.e., forward of the bag-shaped materials 76B).

On the other hand, mainly the downward-directed components among the urging forces of the respective extension coil springs 80 apply a negative spring constant to the cloth spring material 68 via the spring hanging member 74 (a downwardly-directed spring constant, with respect to the cloth spring material 68 which has an upwardly-directed spring constant). Namely, due to the cloth spring material 68 (the cushion material 18) being pulled downward by the respective extension coil springs 80, the longitudinal spring constants of the portions to which these tensile forces are applied are decreased.

Further, the rearward-downward urging forces of the respective extension coil springs 80 regulate the flexing of the cloth spring material 68. Namely, at the time of sitting, the extension coil springs 80 move rearward the regions of the cloth spring material 68 where the maximum flexing downward is generated, as compared with a structure which is not provided with the extension coil springs 80. Note that the arrangement of the extension coil springs 80 and the bag-shaped material 76 will be described later.

The respective extension coil springs 80 (and the bag-shaped material 76B) function as elastic members which generate downward tensile force. Note that the bag-shaped materials 76B can also make the connecting member exhibit a damping function by, for example, being structured by a two-dimensional knit fabric which can extend and contract accompanying internal damping, in the same way as the cloth spring material 68.

Further, as shown in FIG. 7, a pushing plate 82 and the compression coil springs 84, which are for applying pushing force to the pushing plate 82, are provided below a portion of the cloth spring material 68 which is further forward than the front-rear direction central portion thereof.

As shown in FIG. 4, the pushing plate 82 is formed in a substantially rectangular shape as seen in plan view which is long in the left-right direction, and is an elastic member which can bendingly deform in the front-rear direction. The rigidity of the pushing plate 82 is set so as to obtain a preferable rigid surface arrangement of the cushion material 18 which will be described later.

On the other hand, a plurality of (three in the present embodiment) the compression coil springs 84 are provided, and respective one end portions thereof are anchored within the concave portion 66A of the supporting frame 66 of the frame 14 for the sitting portion. These compression coil springs 84 are disposed at uniform intervals along the left-right direction, so as to be symmetrical with respect to a left-right direction central line of the cloth spring material 68.

And, the respective compression coil springs 84 which are positioned at the left-right direction both ends are disposed further inward than the both ends of a top plate portion 86A which will be described later.

As shown in FIG. 7, the pushing plate 82 is mounted, so as to be unable to fall off, to the other end portions (top end portions) of these compression coil springs 84. The pushing plate 82 is structured such that, when the movable frame portion 42 is positioned at the initial position, in the natural states of the respective compression coil springs 84, the pushing plate 82 is positioned beneath the cloth spring material 68 and does not contact the cloth spring material 68. Further, the pushing plate 82 is structured such that, when, accompanying sitting, the movable frame portion 42 rotates forward and moves the spring hanging member 74 forward, the pushing plate 82 contacts the cloth spring material 68 and compresses the respective compression coil springs 84, and pushes the cloth spring material 68 (the cushion material 18) upward from beneath due to the elastic forces of the respective compression coil springs 84.

In this way, the pushing plate 82 and the respective compression coil springs 84 add tension to the cloth spring material 68, and the cloth spring material 68, which flexes downward accompanying sitting, forms, at a predetermined position in the front-rear direction, a dam S which is a portion rising up toward the frame pipe 30. Note that, in the vehicle seat 10 in which the hip point is high and the seating angle is small, in order to form the dam S at the appropriate position, a structure is preferable in which the pushing plate 82 is made to contact the cloth spring material 68 in the state before sitting. The dimensions and arrangement and the like of the pushing plate 82 for forming the dam S at the appropriate position will be described later.

Further, returning to FIG. 1, the cushion material 18 has an upper cushion member 86 serving as a "surface skin material" structuring the surface layer portion of the cushion material 18. This upper cushion member 86 is structured by the three-dimensional solid knit fabric 110 (to be described later) which serves as an elastic member. Further, the upper cushion member 86 is layered on the cloth spring material 68 and is stretched in the left-right direction at the frame 14 for the sitting portion.

Concretely, the front end portion of the upper cushion member 86 is folded over, and the upper cushion member 86 is stretched between the side frames 28, and is also supported by the frame pipe 30 (or an unillustrated front end frame) which spans between the left and right side frames 28. Further, the upper cushion member 86 is stretched between the left and right side frames 28 of the frame 14 for the sitting portion at a tension such that the elongation thereof is less than 5%.

Further, as shown in FIG. 2, the top plate portion (top surface) 86A which is positioned at the left-right direction center of the seat cushion 20 and which the buttocks and femoral regions of the seated person contact, a pair of left and right bank portions 86B which are positioned at the left-right direction both end portions of the top plate portion 86A, and intermediate portions 86C which are respectively positioned between the top plate portion 86A and the left and right bank portions 86B, are formed at the upper cushion member 86 (the cushion material 18). The top plate portion 86A, the bank portions 86B, and the intermediate portions 86C are respectively formed along substantially the entire front-rear direction length of the seat cushion 20. Further, the bank portions 86B are formed so as to swell further upward than the top plate portion 86A.

Moreover, the cushion material 18 is provided with a surface skin 88 which covers the outer surface of the upper cushion member 86. The surface skin 88 is structured by a raw material at which it is difficult for elongation to arise as compared with, for example, the upper cushion member 86 (the three-dimensional solid knit fabric 110) of real leather or the like, and is layered (placed) on the top plate portion 86A and the bank portions 86B at the upper cushion member 86.

Further, the surface skin 88 is sewn and attached to the upper cushion member 86 at the left-right direction end portions of the top plate portion 86A and the bank portions 86B (i.e., the end portions of the intermediate portions 86C). In this way, it is easy for the upper cushion member 86 to elongate in the left-right direction at the intermediate portions 86C thereof, and this elongation in the left-right direction is regulated by the surface skin 88.

Moreover, the left-right direction widths of the intermediate portions 86C of the upper cushion member 86 are changed continuously along the front-rear direction, so as to be maxima (extremely large) at positions in the front-rear direction which correspond to positions Z beneath the ischial tuberosities of the seated person. In this way, the upper cushion member 86 (the cushion material 18) is structured so as to be the most easy to elongate in the left-right direction (easy to flex downwardly at the time of sitting) at the positions Z of the ischial tuberosities. Note that the positions Z beneath the ischial tuberosities will be described later.

Here, generally, in order to stabilize the seated posture while mitigating pain and the like of the seated person at the seat, it is preferable to make the compliance of the seat cushion 20 conform to (match) the compliance of the human body (the seated person). Incidentally, among human bodies, individual differences are great, and the physical abilities and seated postures are also different, and the ways of handling seating over a long time period are also different. Further, the respective regions of a human body show a three-dimensional configuration and are structured by many parameters. Among these parameters, individual differences are great especially with respect to the dynamic characteristic of the muscles. Moreover, at the respective regions of a human body, the respective parameters vary in accordance with the shaking of the human body due to the behavior of the vehicle while traveling.

Thus, in the seat cushion 20 having the upper cushion member 86 which is structured by the three-dimensional solid knit fabric 110 and is stretched at the frame 14 for the sitting portion, in order to make the compliance of the seat cushion 20 conform to the varying compliance of a human body, it is desirable to support the cloth spring material 68 so that the directions of tension are in three dimensions, and to vary the compliance of the seat cushion 20 on the basis of various types of parameters of the cloth spring material 68. In this way, a good feel, fitting sensation, bottoming sensation, and stroke sensation, which contribute to stabilizing the seated posture while mitigating pain and the like of the seated person at the seat cushion 20, are created.

As parameters at the cloth spring material 68 for making the compliance of the seat cushion 20 conform to the varying compliance of the human body, there are the tension in the tangent direction (the surface direction), the elastic force (restoring force) and damping force in the normal line direction, the planar rigidity which varies in accordance with the surface area over which pressure is applied by the human body, and the nonuniform tension fields arising due to the supporting structure of the cloth spring material 68. Further, more concretely, the tension fields at the cushion material 18 at the time of sitting are preferably set as shown in FIG. 9 on the basis of the aforementioned respective parameters.

Namely, by setting the tension at regions A at the left and right both sides of the cushion material 18 and the tension at region B in the left-right direction and further forward than the ischial tuberosities Z, to be higher than the tensions at region C and region D respectively, the front-rear direction and left-right direction movement of the seated person on the seat cushion 20 can be suppressed. Namely, region C has a lower tension than region A and region B, in order to aim for comprehensive compliance matching with human bodies structured by skeletons and by skin and muscles and having different compliances. In this way, at bone protruding portions such as the sacral bone region and the ischial regions and the like, deformation which is greater than the peripheral portions arises locally at the cushion member 18 (the tension structure), but at the peripheral portions of the bone protruding portions where muscles occupy the majority, deformation which is greater than the cushion characteristic which approximates the muscles does not arise. Due to these characteristics, comprehensive compliance matching between the human body and the cushion material 18 (the tension structure) is aimed for. Therefore, the offset force (the tangent direction of the surface) and the pressure (the normal line direction) which are applied to the skin and muscles are reduced, and numbness and pain due to sitting for a long time period can be reduced.

Figure 9:
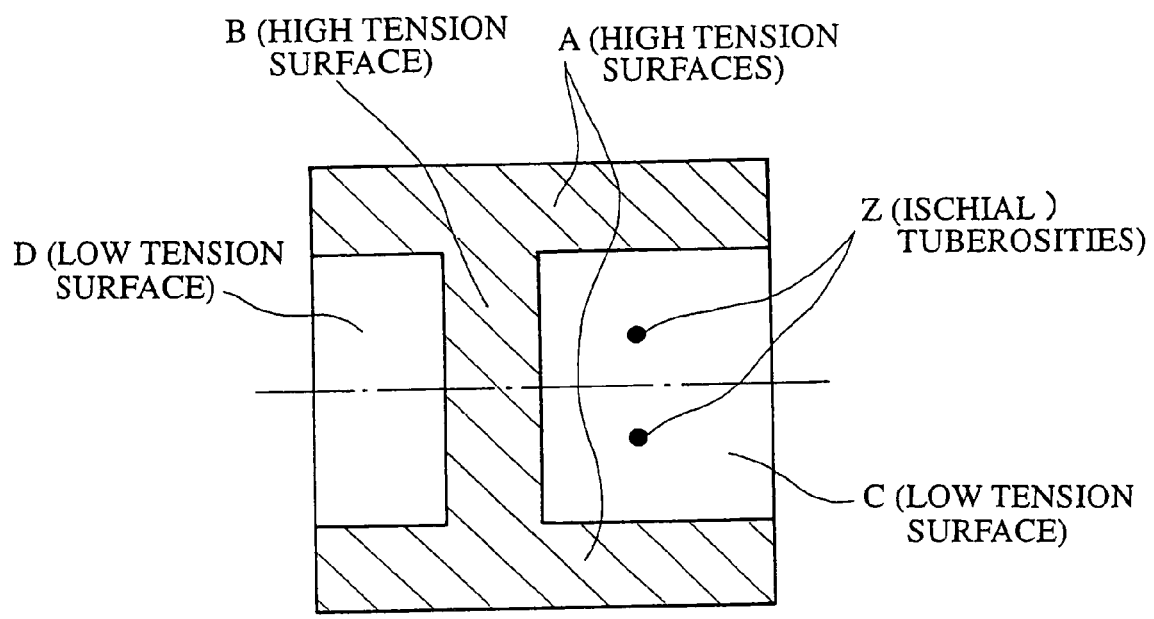
FIG. 9 is a schematic diagram showing preferable tension fields at the seat cushion of the vehicle seat relating to the embodiment of the present invention.

The structure of the above-described seat cushion 20 generates the tension fields shown in FIG. 9 (adjusts the tension) at the cushion material 18 in order to conform to the compliance of the human body. In order to suit the shape of a person (a seated person), the respective structural elements and the like of the above-described seat cushion 20 are formed, arranged, or set at the dimensions expressed hereinafter. Further, these dimensions and the like are set by using the positions Z beneath the ischial tuberosities as the reference.

Figure 10:
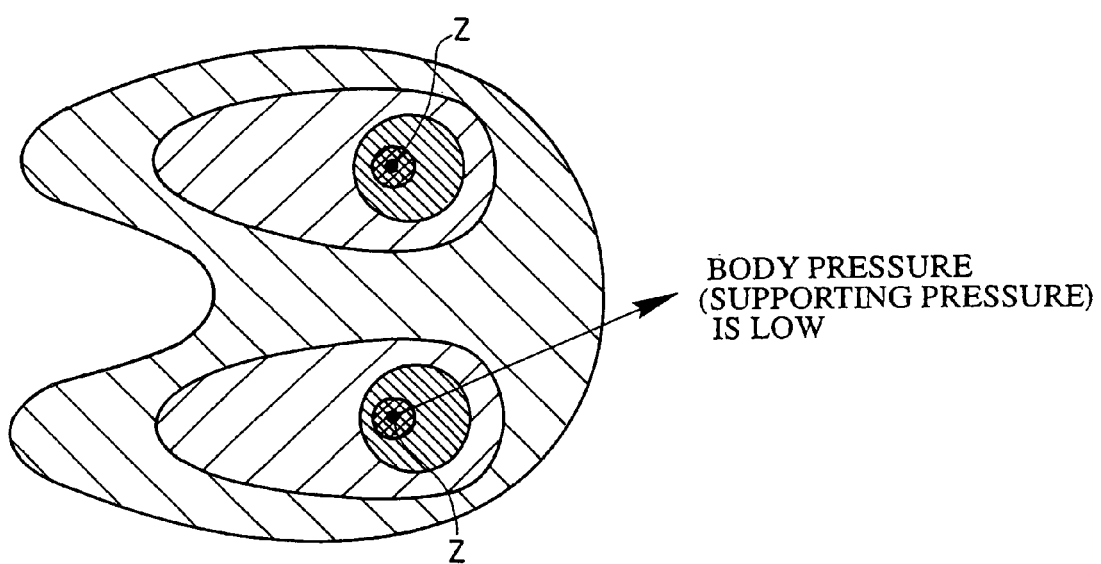
FIG. 10 is a load distribution diagram at the buttocks and femoral regions of a seated person.
Figure 11:
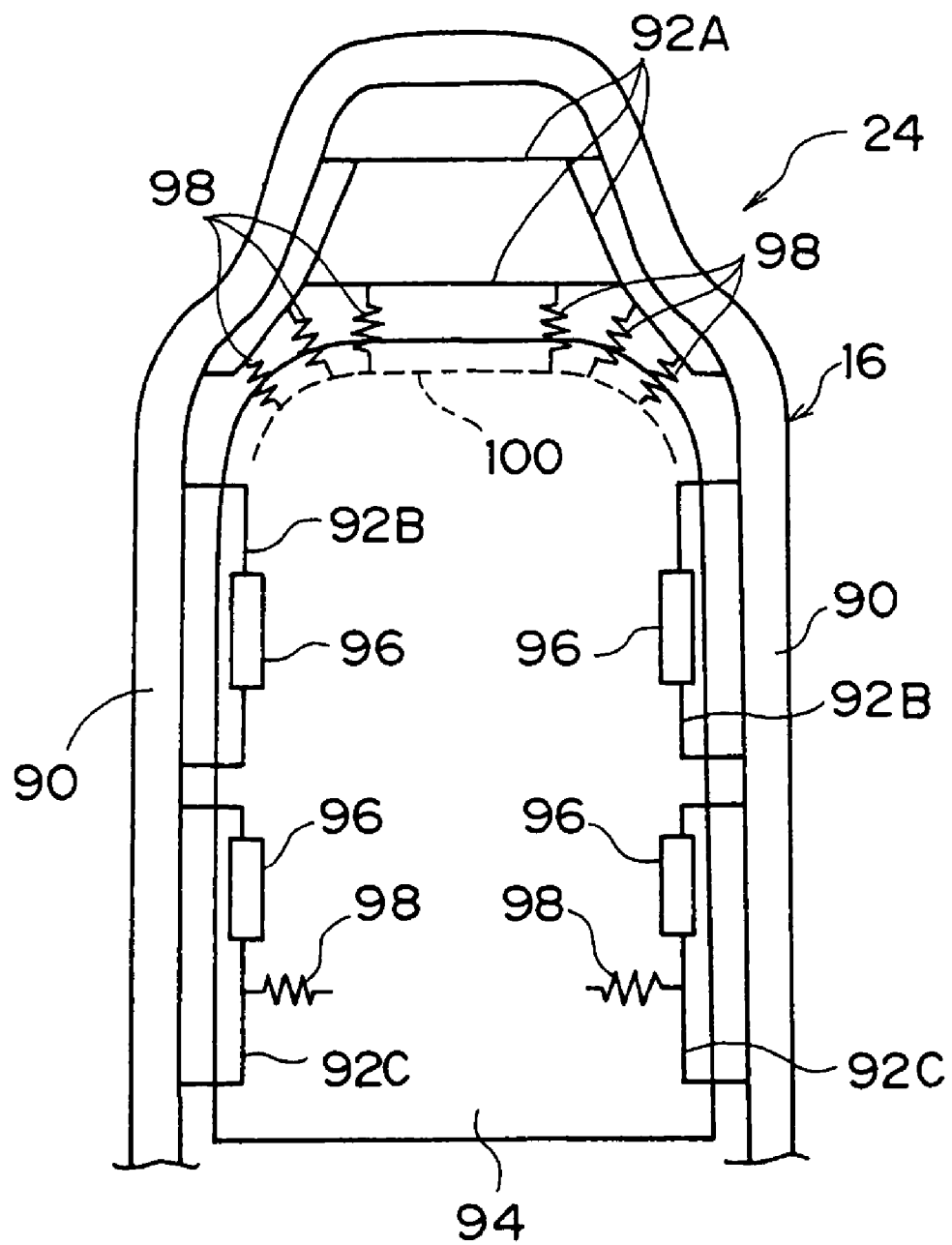
FIG. 11 is a rear view showing a stretched state of a cloth spring material structuring a seat back of the vehicle seat relating to the embodiment of the present invention.

As shown in FIG. 10, it is known that the body pressure (supporting pressure) of the seated person is high at vicinities of the positions Z beneath the ischial tuberosities (e.g., substantially 80% of the body weight concentrates in ranges of diameters of 98 mm centered directly beneath the ischial tuberosities). In this way, the setting of the dimensions of the respective portions structuring the seat cushion 20 by using the positions Z beneath the ischial tuberosities as a reference, is in order to set the tension fields of FIG. 9 from around the ischial tuberosities to the thighs on the basis of this knowledge.

Figure 8:
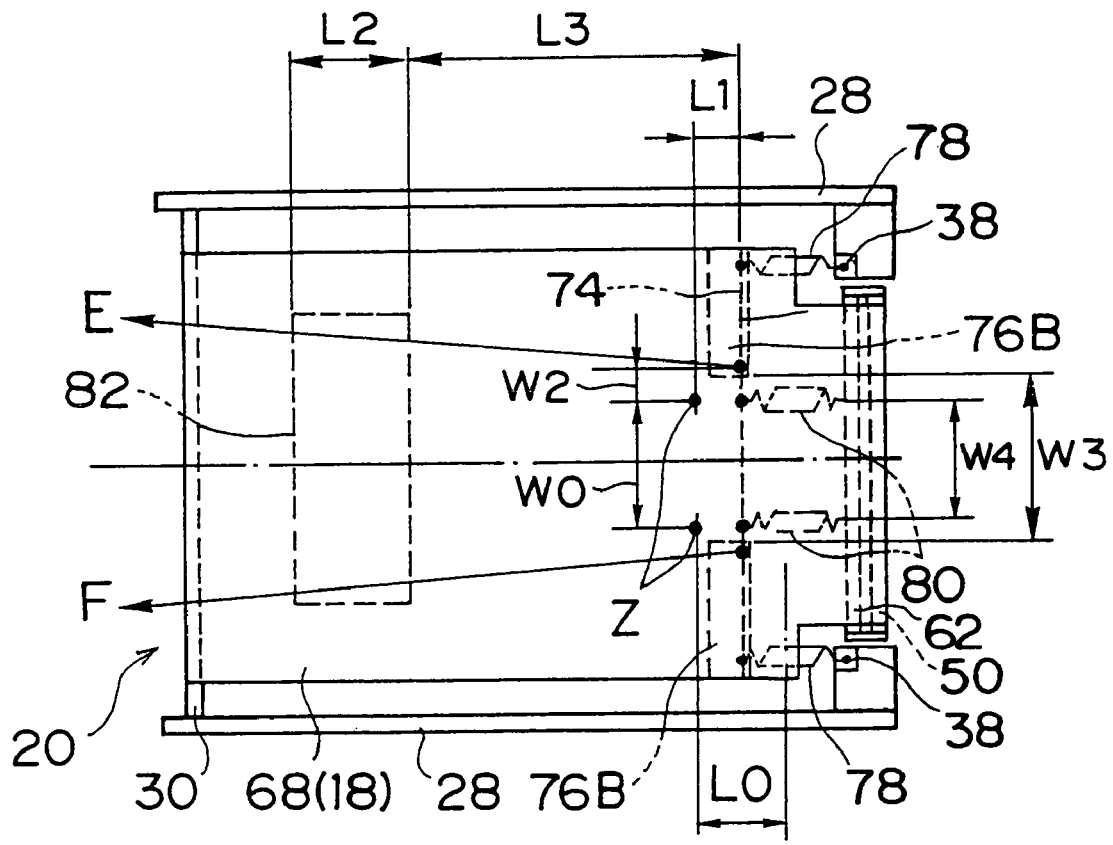
FIG. 8 is a diagram for explanation of dimensions of the frame for the sitting portion and the cloth spring material structuring the seat cushion of the vehicle seat relating to the embodiment of the present invention.

Here, it is known that an interval W0 between the left and right ischial tuberosities is 100 mm to 115 mm for a Japanese adult male, and is 110 mm to 130 mm for a Japanese adult female. Further, in the present embodiment, as shown in FIG. 7 and FIG. 8, the positions Z beneath the ischial tuberosities are set at positions such that a distance L0 in the front-rear direction from the rear end of the seat cushion 20 (the front surface of the lower portion of the seat back 24 at the time of sitting) is substantially 100 mm.

Further, in order to obtain the tension fields of FIG. 9, at the seat cushion 20, it is preferable to set the positions at the cloth spring material 68 where the urging forces of the extension coil springs 80 are applied, to be slightly at the outer sides and at the rear sides of the left and right positions Z beneath the ischial tuberosities. Therefore, in the present embodiment, as shown in FIG. 8, on the basis of the standard physique of a Japanese (a height of 170 cm and a slightly long-torsoed physique), the spring hanging member 74 is disposed at a position such that a distance L1 rearward from the positions Z beneath the ischial tuberosities is substantially 30 mm, and the inner side (bag-shaped material 76A side) end portions of the respective bag-shaped materials 76B are disposed at positions such that a distance W2 outwardly from the position Z beneath the ischial tuberosity at the corresponding left or right side is substantially 20 mm.

Namely, for example, if the interval W0 between the ischial tuberosities is set to 110 mm, an interval W3 between the left and right bag-shaped materials 76B is substantially 150 mm. Further, an interval W4 between the extension coil springs 80 is 100 mm in the present embodiment. In this way, by disposing the respective extension coil springs 80 between the left and right bag-shaped materials 76B in the left-right direction (at the inner side of the interval W4), the tensions due to the rearward urging forces of the extension coil springs 80 is applied in directions slightly inclined with respect to the front-rear direction (the directions in which the legs open) in accordance with the size of the seat and as shown by arrow E and arrow F in FIG. 8, or in rectilinear directions, i.e., the directions corresponding to the regions A in FIG. 9. Further, due to this setting, at the region C where the downward urging forces of the extension coil springs 80 are applied, the longitudinal spring constant is reduced as described above, and is structured equivalently to the tension being smaller than at the regions A.

Note that the settings of these dimensions are adjusted in accordance with, as one example, the seating angle due to the height of the hip point of the vehicle seat 10, the design shape, and physique differences. The adjustment width is ±40 mm respectively at distance L1 and distance W2 (there may be cases in which the spring hanging member 74 is positioned further forward than the positions Z, or the end portions of the bag-shaped materials 76B are positioned between the left and right ischial tuberosities).

Further, in order to obtain the tension fields of FIG. 9, at the seat cushion 20, the positions at the cloth spring material 68 where the urging forces of the extension coil springs 78 are applied, are set to be at the left-right direction outer sides of the pelvis of the seated person. In this way, the cloth spring material 68 at the time of sitting is structured such that the portions supporting the femoral regions of the seated person are high tension.

Further, in order to form the region B (see FIG. 9) of a high tension surface of the dam S at the front of the buttocks of the seated person, a front-rear direction length (width) L2 of the pushing plate 82 is made to be substantially 100 mm, and the pushing plate 82 is disposed such that a distance L3 from the spring hanging member 74 to the rear end portion of the pushing plate 82 is within a range from 250 mm to 350 mm. This distance L3 is determined in accordance with the seating angle due to the hip point. In this way, when, at the time of sitting, the pushing plate 82 pushes the cloth spring material 68 from beneath due to the urging forces of the compression coil springs 84, at the cloth spring material 68 which is flexed downward, front-rear direction tension is added and the planar rigidity (supporting pressure) from the buttocks to the femoral regions of the seated person becomes high, and the dam S is formed.

In order to prevent the seated person from sliding forward by this dam S, it is preferable that the positions Z beneath the ischial tuberosities are positioned in a range of substantially 100 mm or less rearward of the rear end position of the dam S. Further, in the present embodiment, in accordance with the fact that the cloth spring material 68 is pulled rearward and downward by the urging forces of the extension coil springs 80 and the region where the maximum downward flexing arises at the cloth spring material 68 is moved rearward, as shown by the one-dot chain line in FIG. 7, setting is carried out such that the dam S, which is the portion where the cloth spring material 68 rises up toward the frame pipe 30, is formed at the front side from a position at which a distance L4 from the rear end of the seat cushion 20 (the front surface of the lower portion of the seat back 24) is substantially 130 mm. Namely, in the present embodiment, the dam S is formed from a position which is substantially 30 mm (L4-L1) forward of the positions Z beneath the ischial tuberosities.

Further, at the seat cushion 20, as described above, due to the upper cushion member 86 and the surface skin 88 which structure the surface portion of the cushion material 18, the upper cushion member 18 elongates easily at the left and right intermediate portions 86C, and the width of the intermediate portions 86C is a maximum at the positions Z beneath the ischial tuberosities (positions corresponding to the distance L0 from the rear end of the seat back 24). Therefore, the surface rigidities of the top plate portion 86A and the bank portions 86B are relatively high as compared to the intermediate portions 86C. In accordance with the fact that the tension due to the extension coil springs 80 and the pushing plate 82 is added to the cloth spring material 68, the cushion material 18 (the seat cushion 20) is a structure in which there arises tension fields whose directions of tension are in three dimensions.

(Structure of Seat Back)

As shown in FIG. 1, a pair of left and right side frames 90 are provided at the frame 16 for the back portion which structures the seat back 24. The cushion material 22 is stretched between these side frames 90. Further, as shown in a schematic diagram in FIG. 11 as well, wires 92 for fixing, which are for attaching a lower cushion member 94 which will be described later, are provided at the frame 16 for the back portion.

The wires 92 for fixing are structured by upper side wires 92A which are positioned in a vicinity of the top end at the rear side of the frame 16 for the back portion and some of which are suspended between the left and right side frames 90, intermediate wires 92B which are provided respectively at the heightwise direction central portions at the rear sides of the left and right side frames 90, and lower side wires 92C which are provided respectively at the lower portions of the left and right side frames 90.

The lower cushion member 94 is stretched at the wires 92 for fixing of the frame 16 for the back portion. Concretely, at the rear surface of the lower cushion member 94, the left and right both sides of the portion which is lower than the left and right shoulder blades of the seated person, are fixed to the left and right intermediate wires 92B by fixing members 96 respectively. Further, at the rear surface of the lower cushion member 94, the left and right both sides of the portion corresponding to the lumbar vertebrae region of the seated person are fixed to the left and right lower side wires 92C by the fixing members 96 respectively. The fixing members 96 are formed of a material which is hard to elongate as compared with the lower cushion member 94, and have an elastic function and a damping function.

In this way, at the seat back 24, a high rigidity surface is formed from the hips of the seated person to the lower side of the shoulder blades at the time of sitting. On the other hand, by connecting the portions corresponding to the buttocks and shoulder blades, which jut-out further rearward than the hips of the seated person, to the wires 92 for fixing via extension coil springs 98, the surface rigidities of these portions corresponding to the buttocks and shoulder blades are set to be low (negative spring constants are applied to these portions, and the spring constants in the front-rear direction of these portions at the time of sitting are lowered).

Concretely, a spring hanging member 100 formed of a steel material is sewn to the lower cushion member 94 in a vicinity of the top end which is positioned above the portion corresponding to the shoulder blades of the seated person. The other end portions of the plural extension coil springs 98, whose respective one end portions are anchored on the upper side wires 92A, are respectively anchored on the spring hanging member 100. In this way, the lower cushion member 94 is elastically connected to the wires 92 for fixing which are positioned at the rear side of the lower cushion member 94. Similarly to the spring hanging member 74, the spring hanging member 100 is structured so as to not cause the seated person to feel a sensation that a foreign object exists.

Further, due to the other end portions of the pair of left and right extension coil springs 98, whose one end portions are anchored to the left and right lower side wires 92C respectively, being attached directly at positions corresponding to the buttocks, the lower cushion member 94 is elastically connected to the wires 92 for fixing which are positioned at the rear side thereof.

Due to the above, at the seat back 24 as well, the directions of tension of the lower cushion member 94 are in three dimensions. In the same way as the seat cushion 20, the lower cushion member 94 is supported by the extension coil springs 98 so that the directions of tension are in three dimensions, in order for the compliance of the seat back 24 to conform to the changing compliance of the human body. Note that, at the lower cushion member 94, the directions of tension before sitting are in three dimensions.

(Concrete Structure of Seat Back)

Figure 12:
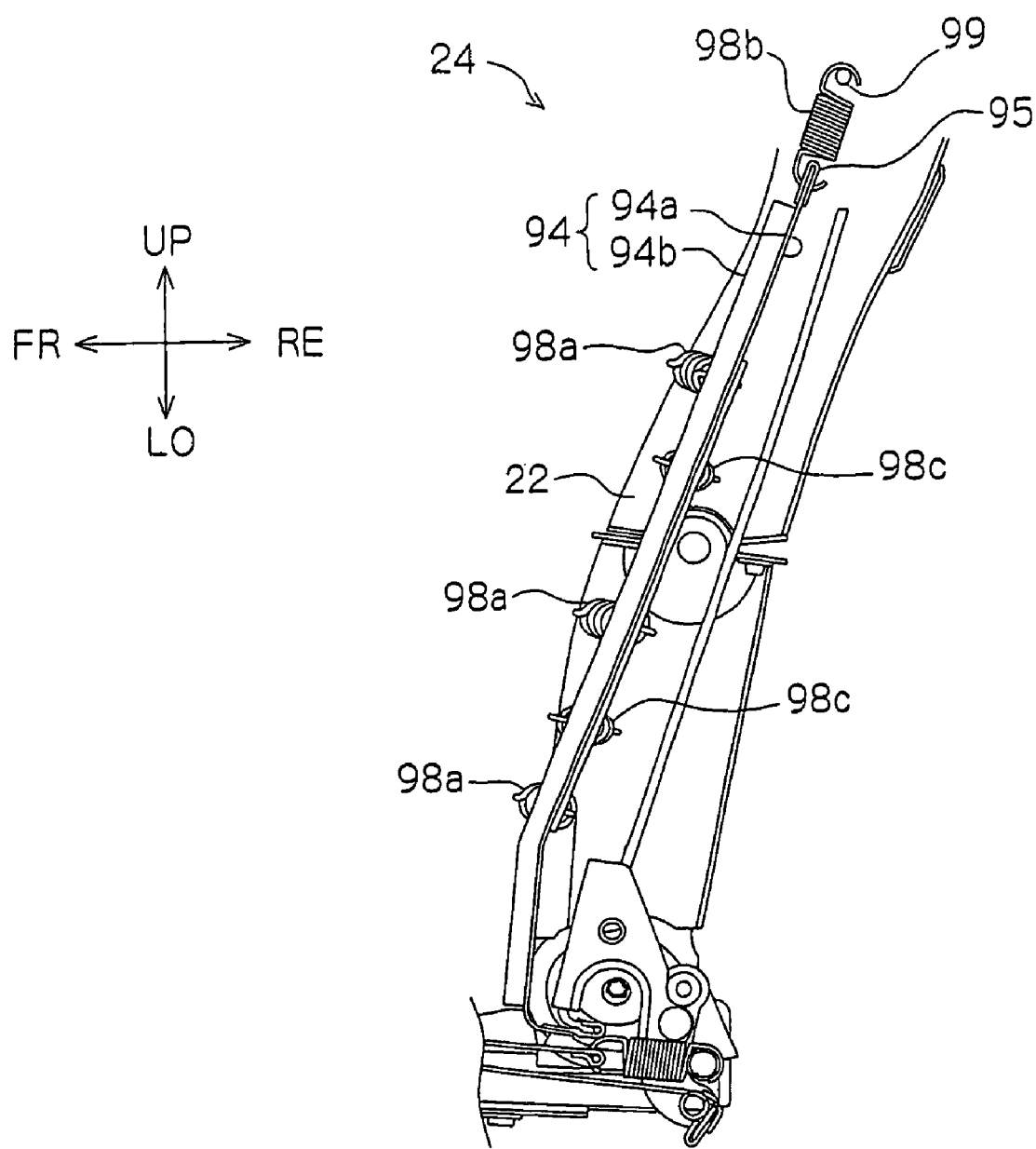
FIG. 12 is a side view of a back seat of the vehicle seat, as seen with a near-side side frame removed.
Figure 13:
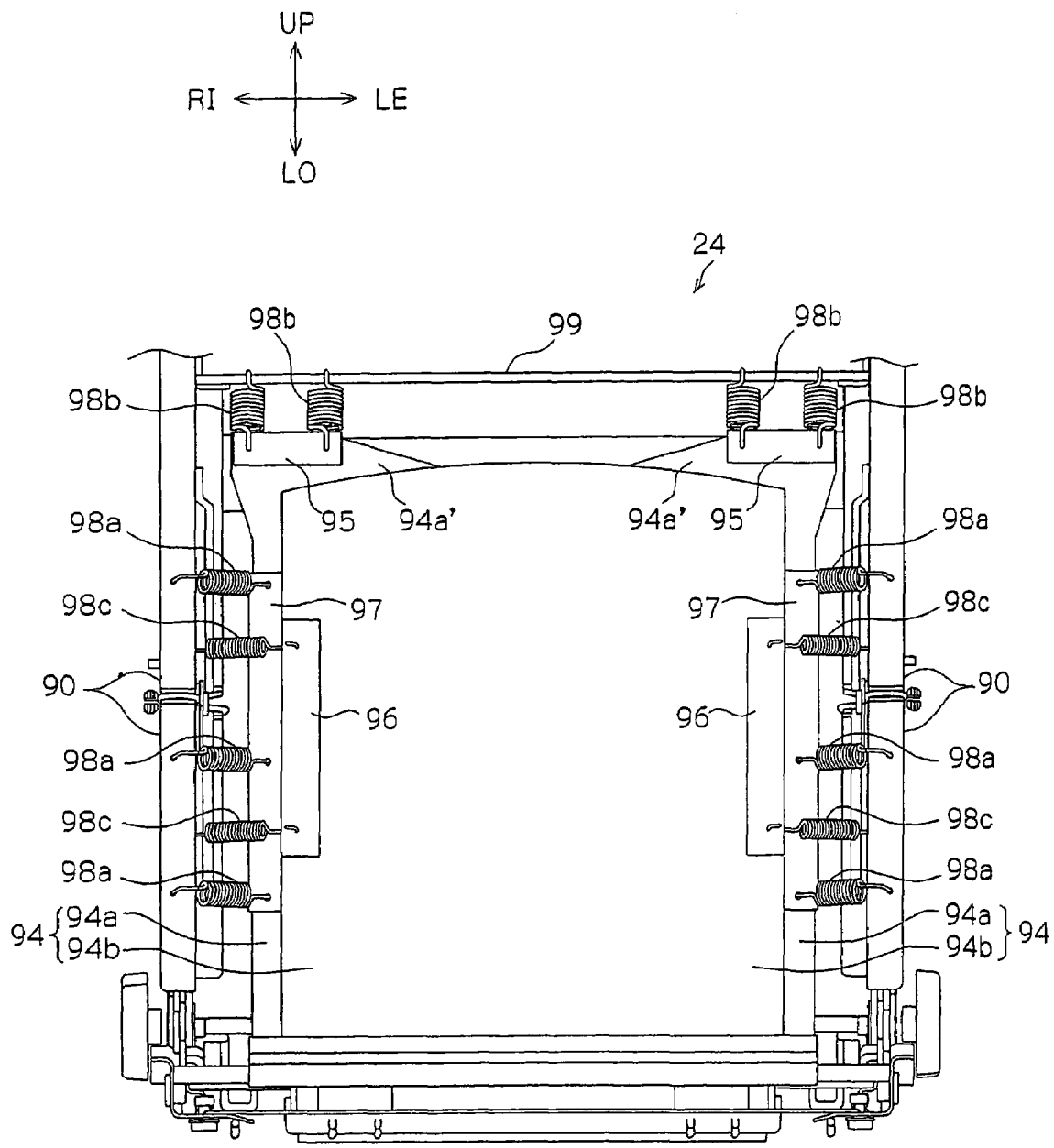
FIG. 13 is a front view of the back seat of the vehicle seat.

The concrete structure of the seat back 24 is shown in FIG. 12 and FIG. 13. The seat back 24 has the side frames 90, the lower cushion material 94, the extension coil springs 98 (98$a$, 98$b$, 98$c$) which anchor the lower cushion material 94 on the side frames 90, and the cushion material 22 of the surface skin.

The lower cushion material 94 is structured by layering a three-dimensional tension structure 94$b$ on a two-dimensional tension structure (cloth spring material) 94$a$. The two-dimensional tension structure 94$a$ and the three-dimensional tension structure 94$b$ are sewn along the left-right direction central line of the side frames 90 (the spine of the seated person), and are made integral together at this central portion in the left-right direction.

The two-dimensional tension structure 94$a$ is a two-dimensional knit fabric of a mesh (net) structure. At the two-dimensional tension structure 94$a$, elongation accompanying internal damping due to tension, and restoration due to canceling of that tension, are possible. As shown in FIG. 13, the two-dimensional tension structure 94$a$ has two jutting portions 94$a'$ which are formed such that the upper end portion of the two-dimensional tension structure 94$a$, except for the left-right direction central portion thereof, juts-out slightly upwardly and outwardly in the left-right direction. Therefore, the two-dimensional tension structure 94$a$ is formed overall in a substantial Y shape.

Respective reinforcing members 95 are sewn and fixed to the top ends of the left and right jutting portions 94$a'$. One end portions of the respective extension coil springs 98$b$ are anchored on the reinforcing members 95. The other end portions of the respective extension coil springs 98$b$ are anchored on an anchor rod 99 which fixedly spans between the top ends of the left and right side frames 90 (further upward than the top edges of the respective jutting portions 94$a'$). In the present embodiment, two of the extension coil springs 98b are provided at each jutting portion 94a' (reinforcing member 95).

Reinforcing members 97 are sewn and fixed to the left and right both side portions of the two-dimensional tension structure 94a. One end portions of a plurality of (three each in the present embodiment) the extension coil springs 98a are anchored on each reinforcing member 97. The other end portions of the respective extension coil springs 98a are anchored on the front edge portions at the side frames 90. In this way, the two-dimensional tension structure 94a is stretched at the side frames 90 so as to be pulled forward.

The reinforcing members 96 are sewn and fixed to the left and right both side portions of the three-dimensional tension structure 94b. One end portions of a plurality of (two each in the present embodiment) the extension coil springs 98c are anchored on each reinforcing member 96. The other end portions of the respective extension coil springs 98c are anchored on the front-rear direction intermediate portions of the side frames 90, so that the three-dimensional tension structure 94b is pulled rearward.

The respective extension coil springs 98c are disposed between the respective extension coil springs 98a in the heightwise direction. Namely, the extension coil springs 98a and the extension coil springs 98c are disposed alternately at different positions with respect to the heightwise direction. In the present embodiment, three of the extension coil springs 98a and two of the extension coil springs 98c are anchored on each of the left and right side frames 90.

In the vehicle seat 10 having the above-described structure, tension fields, at which the directions of tension are in three dimensions, are generated at the lower cushion material 94. Namely, the forward pushing-out force, which is applied to the respective portions in the heightwise direction at the left and right both side portions of the two-dimensional tension structure 94a, is reduced (mitigated) or cancelled (offset) by the rearward pushing-out force which is applied to the three-dimensional tension structure 94b between these portions where the forward pushing-out force is applied. Further, in a steady state (a state in which there is no change in the load applied to the seat back 24), tension fields in three dimensions arise at the lower cushion material 94. In this way, at the vehicle seat 10, the planar rigidity of the lower cushion material 94 can be increased, and even if, for example, a person of a large build sits at the seat back 24 (the side frames 90) which is wide, the seated person is supported so as to not have a stooped posture.

Further, at the vehicle seat 10, by supporting the lower cushion material 94 by three-dimensional tension (generating tension fields of three dimensions), equivalently, the spring constant in the pushing direction of the lower cushion material 94 is continuously changed in the heightwise direction in accordance with the distribution of mass of the upper body half of the seated person. In this way, the support load at the time of sitting can be dispersed.

For example, in a conventional urethane seat, vibrational energy transmitted from the side frames 90 concentrated at load concentration portions arising due to the lack of correspondence between the shape of the urethane (the cushion material) and the shape of the human body. In contrast, in the vehicle seat 10 of the present embodiment, the vibrational energy, which is transmitted from the side frames 90 via the extension coil springs 98a, 98b, 98c, is absorbed by the lower cushion material 94 (converted into frictional force of the two-dimensional tension structure 94a and the three dimensional tension structure 94b, and consumed), and thereafter, is inputted to the human body as vibration in accordance with the load distribution. Accordingly, vibrations which are sensed bodily by the seated person are greatly reduced, and the comfort of the ride improves.

Further, at the vehicle seat 10, when impact vibrations are inputted to the seat back 24, the elongation of the extension coil springs 98a becomes great with respect to the force in the pushing direction (rearward), and the tension of the two-dimensional tension structure 94a increases. On the other hand, because the extension coil springs 98c, which support the three-dimensional tension structure 94b, contract, the tension of the three-dimensional tension structure 94b decreases. As a result, deformation of the three-dimensional tension structure 94b itself, which is at the side near to the human body, becomes large, and the absorption of vibrations by the lower cushion material 94 becomes large.

Moreover, when the two-dimensional tension structure 94a is displaced forward past the initial position before sitting while pushing-out the human body forward by the repulsion force of the extension coil springs 98a which support the two-dimensional tension structure 94a, the forces of the extension coil springs 98c, which pull-back the three-dimensional tension structure 94b rearward, are applied (become relatively large). Therefore, the forward pushing-out force which is applied to the human body is abruptly reduced. Namely, the force, which is attempting to swing-return the human body forward, is abruptly mitigated in the step of that swinging-returning, and the amount of swinging-returning (overshooting) of the human body past the initial position before the input of impact is reduced.

In this way, because the lower cushion material 94 is supported by the above-described three-dimensional tension, the lower cushion material 94 has a non-linear elastic characteristic or damping characteristic. Accordingly, for example, even in a case in which a rearward impact pushing force is applied to the back rest by the swinging of the human body which accompanies riding-over a protrusion or a step, at the vehicle seat 10, the swinging of the human body can be converged promptly by the lower cushion material 94, and the comfort of the ride can be improved.

(Other Concrete Structures of Seat Back)

Figure 14:
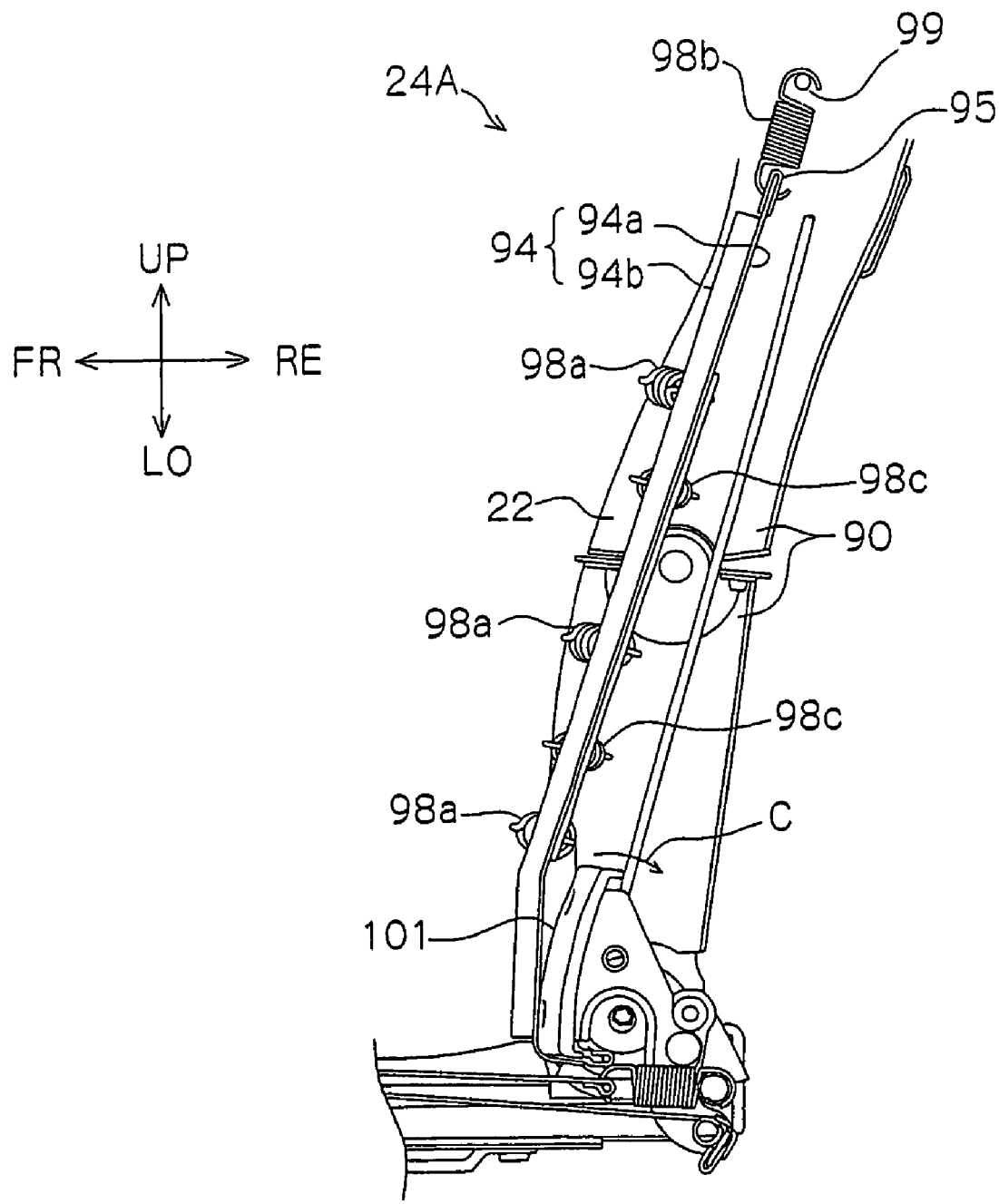
FIG. 14 is a side view of another back seat of the vehicle seat, as seen with the near-side side frame removed.
Figure 15:
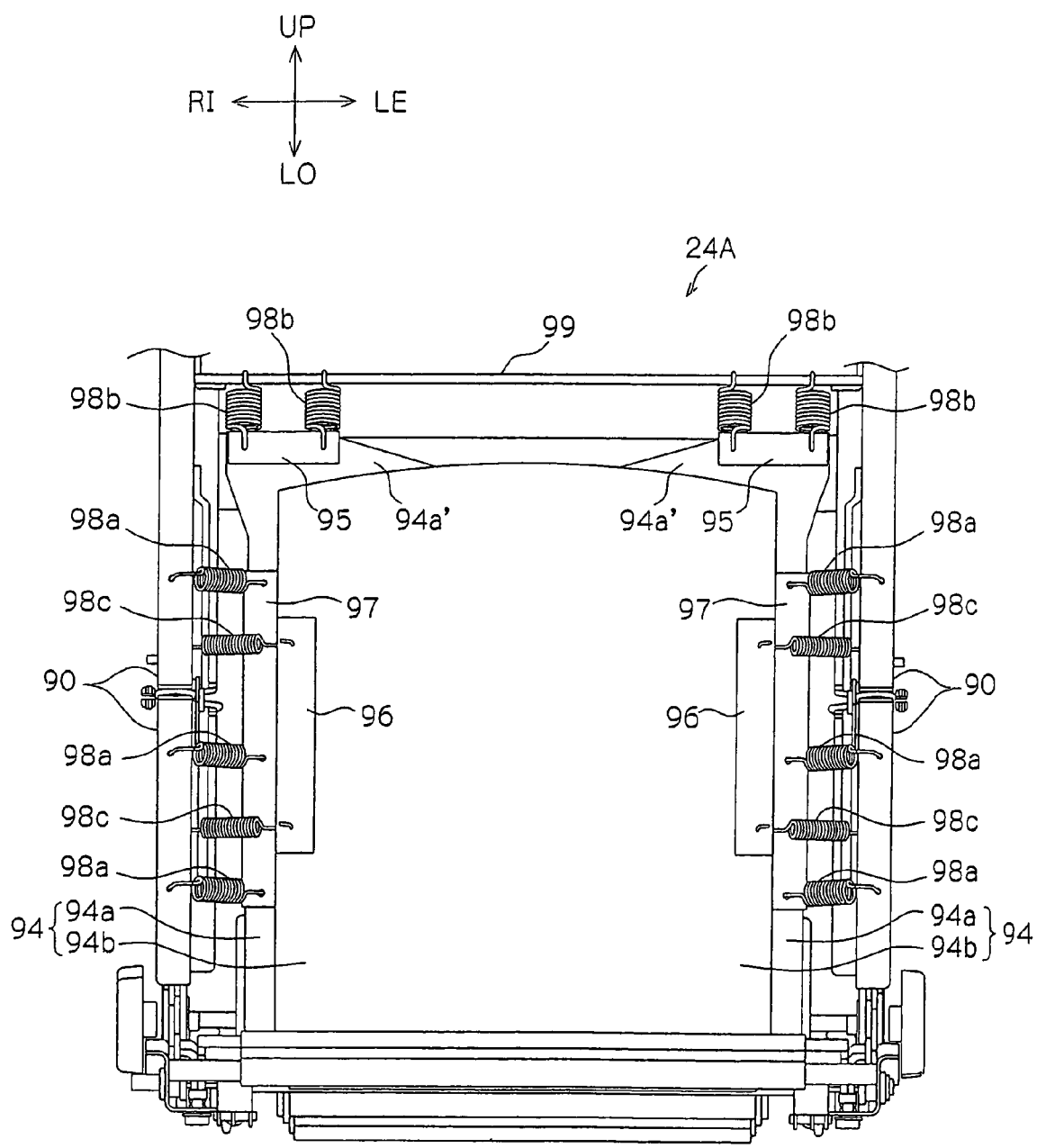
FIG. 15 is a front view of the other back seat of the vehicle seat.

The structure of a seat back 24A will be described by using FIG. 14 through FIG. 16. Note that the same reference numerals are applied to regions which are the same as the above-described regions, and detailed description of these regions will be omitted.

Compared with the seat back 24 shown in FIG. 12 and FIG. 13, the seat back 24A differs mainly with respect to the point that the seat back 24A has a rotatable pelvis plate 101.

Figure 16:
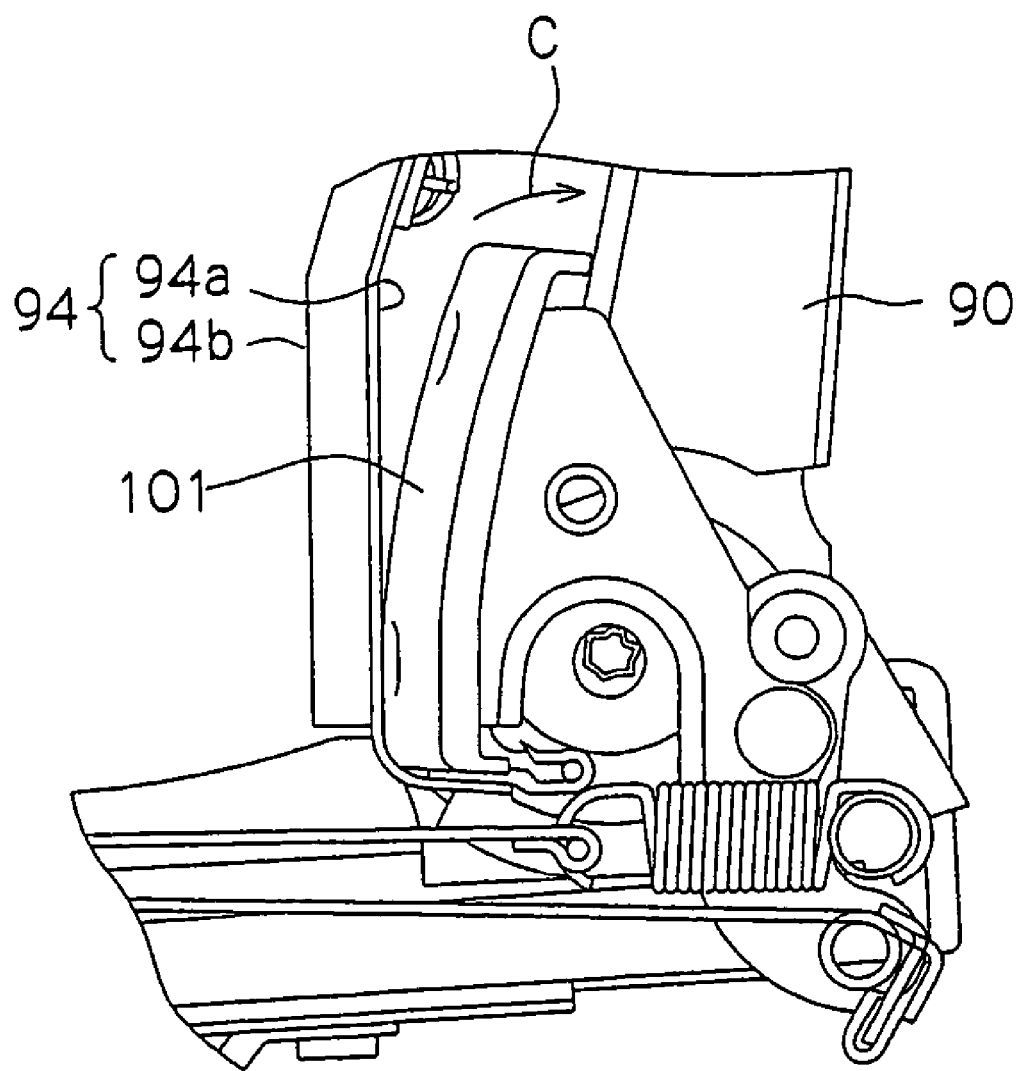
FIG. 16 is an enlarged side view of main portions of the other back seat.

As shown in FIG. 16, the lower edge portion of the two-dimensional tension structure 94a is trained about and anchored on the lower end portion of the pelvis plate 101 which can rotate with respect to the side frames 90. By rotating in the direction of arrow C, the pelvis plate 101 moves the lower end portion thereof substantially upward. In this way, the two-dimensional tension structure 94a rotates the pelvis plate 101 in the direction of arrow C, while twisting the torsion bar by the tension thereof. Further, due to the rotation of the pelvis plate 101 in the direction of arrow C, the two-dimensional tension structure 94a loosens, and the tension thereof is decreased.

In this way, the two-dimensional tension structure 94a of the seat back 24A is anchored on the movable portion of the pelvis plate mechanism 62 which is a tension adjusting mechanism. In this way, when the pelvis plate 101 rotates in the direction of arrow C, the tension of the two-dimensional tension structure 94a decreases in accordance with the amount of movement thereof. Therefore, even in a case in which an impact is inputted to the seat back 24A, the pelvis plate 101 is rotated in the direction of arrow C by the tension (flexing) applied to the two-dimensional tension structure 94a.

Namely, at the vehicle seat 10, even in a case in which an impact is inputted to the seat back 24A, because the two-dimensional tension structure 94a loosens and the pushing-out force toward the front of the seat back 24A decreases, a great impact absorbing effect can be obtained. Further, even in a case in which load accompanying an impact is inputted to (the position of the seat back 24A corresponding to) the pelvis plate 101 from the hips (buttocks) of the seated person via the lower cushion member 94 and the pelvis plate 101 directly rotates in the direction of arrow C due to this load, the two-dimensional tension structure 94a loosens in accordance with the amount of movement thereof, and a great impact absorbing effect can be obtained in the same way as in the above-described case.

(Cushion Material)

Further, returning to FIG. 1, the cushion material 22 has an upper cushion member 102 serving as a "surface skin material" which structures the surface layer portion of the cushion material 22. This upper cushion member 102 is structured by the three-dimensional solid knit fabric 110 (to be described later) serving as an elastic member. Further, the upper cushion member 102 is layered on the lower cushion member 94 and is stretched between the side frames 90 at a tension such that the elongation thereof is less than 5%. Moreover, the upper cushion member 102 goes around the top end of the frame 16 for the back portion and forms a head rest 104.

Moreover, as shown in FIG. 2, a back rest 102A which is positioned at the left-right direction center at the seat back 24 and which the upper body of the seated person contacts, a pair of left and right side support portions 102B which are positioned at the left-right direction both end portions of the back rest 102A, and intermediate portions 102C which are respectively positioned between the back rest 102A and the left and right side support portions 102B, are formed at the upper cushion member 102 (the cushion material 22). The back rest 102A, the side support portions 102B, and the intermediate portions 102C are respectively formed over substantially the entire top-bottom direction length of the seat back 24 (except for the head rest 104).

The side support portions 102B are formed to project further forward than the back rest 102A. Namely, the vehicle seat 10 relating to the present embodiment is a bucket-type in which the body of the seated vehicle occupant enters-in between the pair of left and right side support portions 102B. Note that the head rest 104 is provided at the upper side of the seat back 24 between the side support portions 102B.

The cushion material 22 has a surface skin 106 which covers the outer surface of the upper cushion member 102. In the same way as the surface skin 88, the surface skin 106 is structured of a raw material at which it is difficult for elongation to arise, as compared with, for example, the upper cushion member 102 of real leather or the like. Further, in a state of being layered (placed) on the back rest 102A and the side support portions 102B of the upper cushion member 102, the surface skin 106 is sewn and attached to the upper cushion member 102 at the left-right direction end portions of the back rest 102A and the side support portions 102B (i.e., the end portions of the intermediate portions 102C).

In this way, it is easy for the upper cushion member 102 to elongate in the left-right direction at the intermediate portions 102C thereof, and this elongation in the left-right direction is regulated by the surface skin 106. Further, the left-right direction widths of the intermediate portions 102C of the upper cushion member 102 are changed continuously along the top-bottom direction. In this way, at the seat back 24 (the cushion material 22), the planar rigidity can be set in accordance with the widths of the intermediate portions 102C.

In the above-described seat back 24, at the time of sitting, the tension (planar rigidity) in the top-bottom and left-right directions is adjusted due to the lower cushion member 94 being attached to the frame for the back portion by the fixing members 96 or the extension coil springs 98 in accordance with the regions of contact of the seated person. Further, due to the upper cushion member 102 having the intermediate portions 120C and the widths of the intermediate portions 102C varying continuously along the top-bottom direction, the tension in the left-right direction is adjusted, and tension fields arise. Moreover, the present embodiment is set such that, at the seat back 24, the upper body of the seated person is stably supported at the portion where the planar rigidity is high from the hips of the seated person to the lower side of the shoulder blades, and the buttocks and shoulder blades, which project out further than the hips, are supported by a low rigidity surface (a portion whose spring constant in the front-rear direction is low) and numbness and pain are mitigated.

(Concrete Example of Three-Dimensional Solid Knit Fabric)

Next, an example of the three-dimensional solid knit fabric 110, which is used as the upper cushion member 86 structuring the cushion material 18, and the lower cushion member 94 and the upper cushion member 102 structuring the cushion material 22, will be described.

Figure 17:
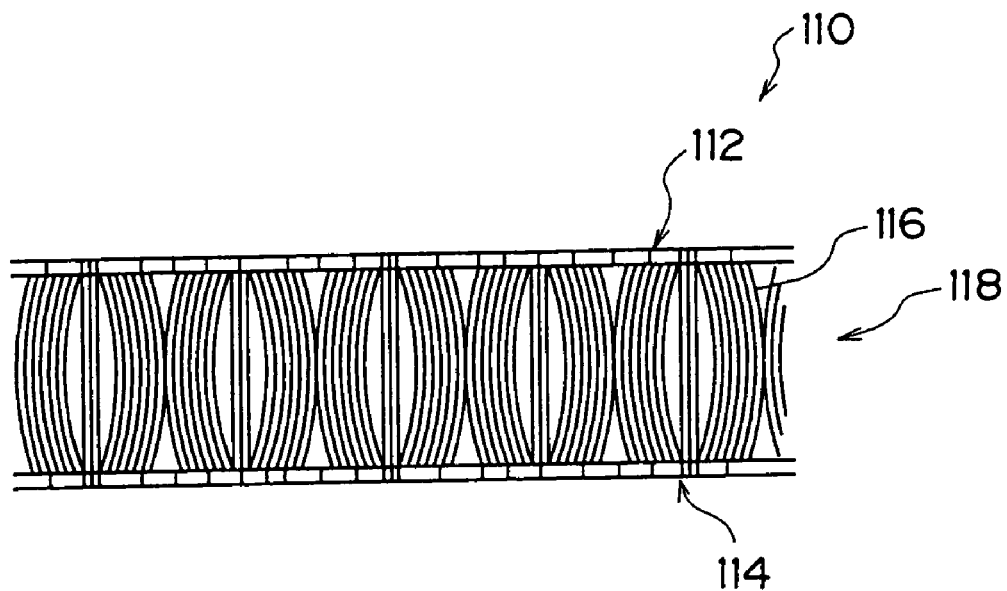
FIG. 17 is a schematic sectional view showing a three-dimensional solid knit fabric used as a cushion member.

As shown in FIG. 17, the three-dimensional solid knit fabric 110 is structured by a pair of ground knit fabrics 112, 114 which are disposed so as to be separated from one another, and a pile portion 118 which is formed by a large number of connecting threads 116 which go back and forth between the pair of ground knit fabrics 112, 114 and join the two.

Figure 18:
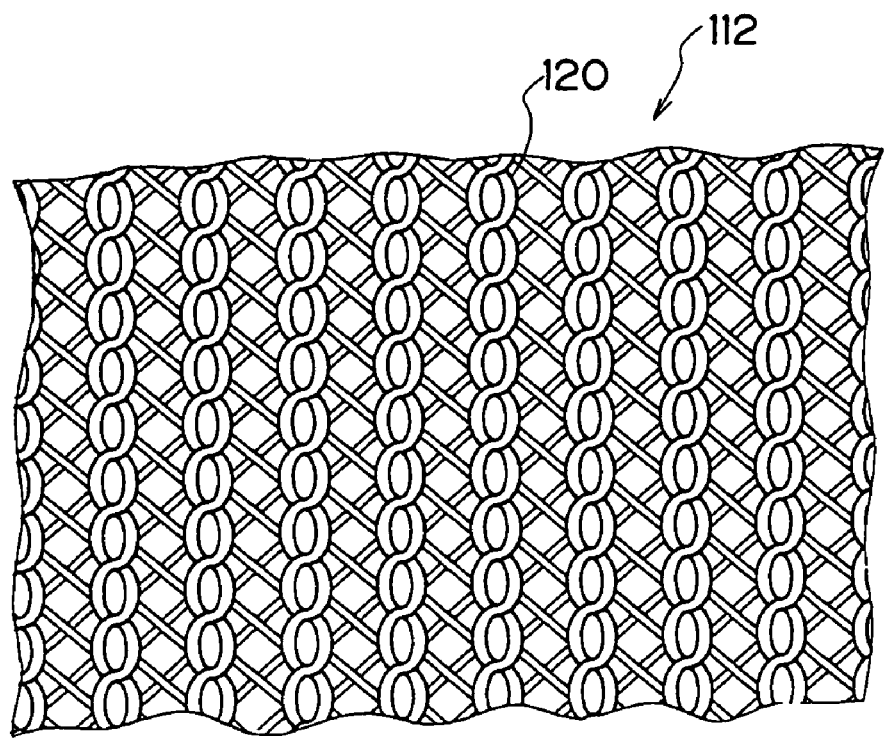
FIG. 18 is a schematic diagram showing an example of one ground knit material used in the three-dimensional solid knit fabric.
Figure 19:
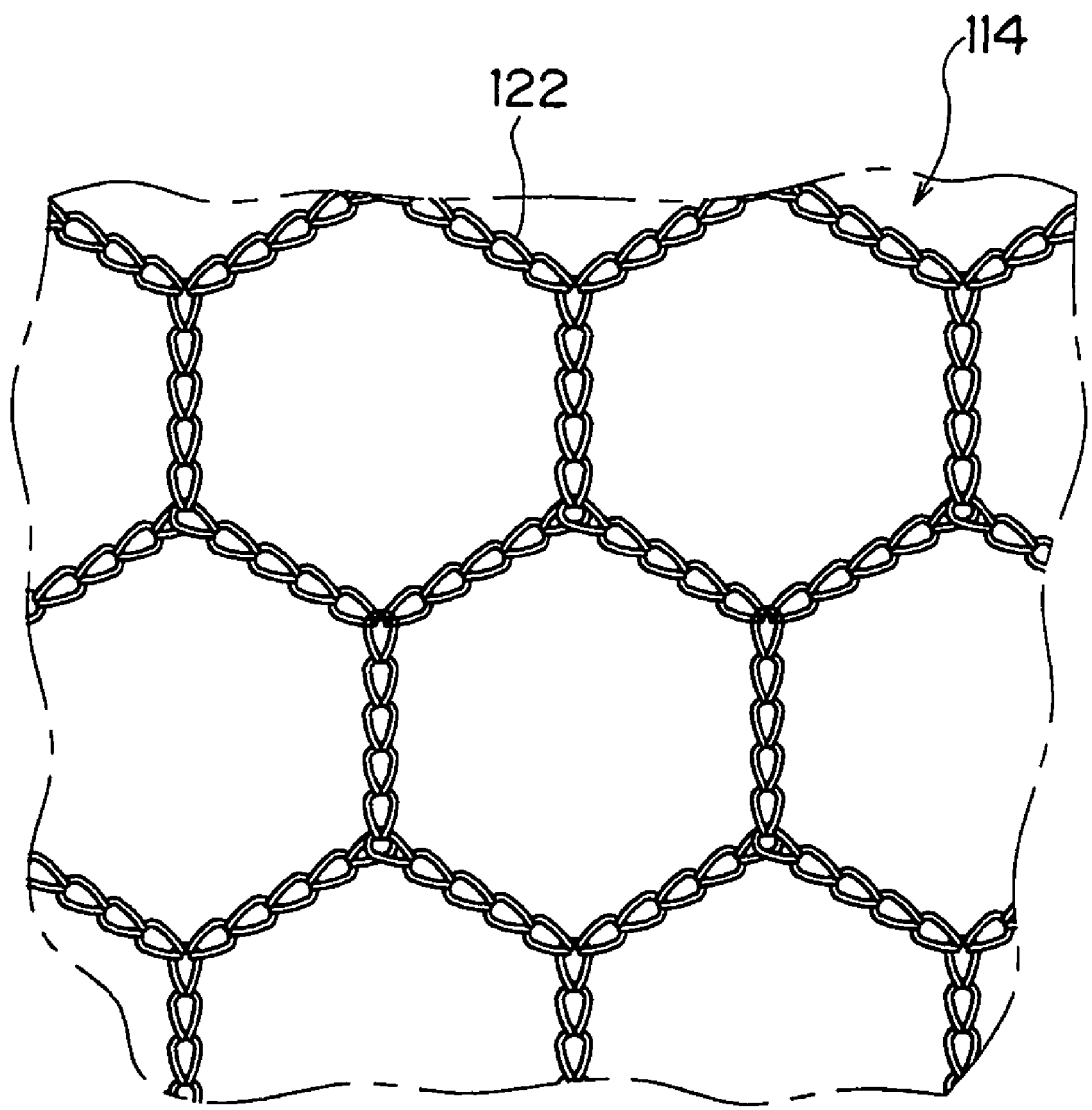
FIG. 19 is a schematic diagram showing an example of another ground knit material used in the three-dimensional solid knit fabric.
Figure 20:
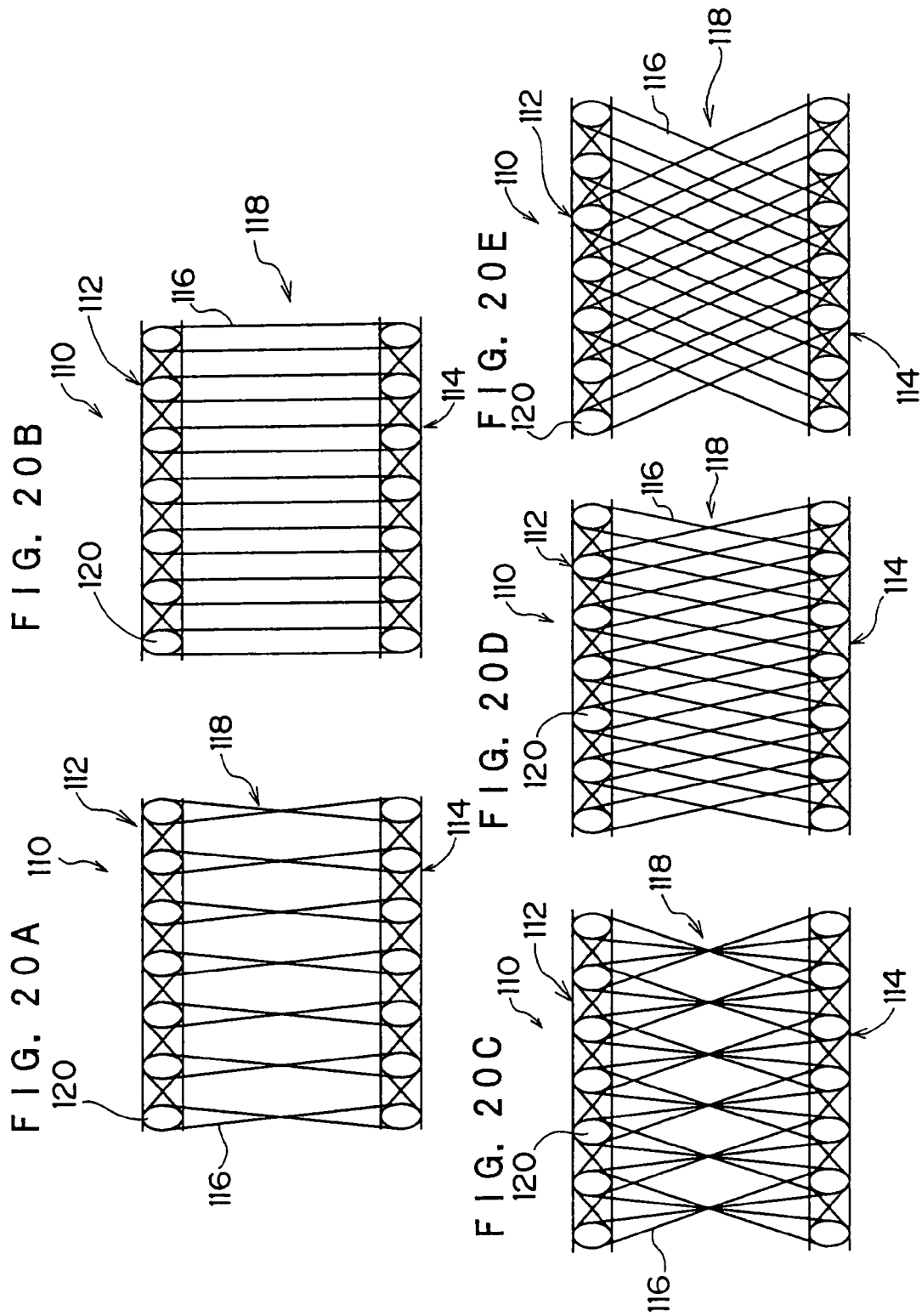
FIGS. 20A through 20E are respectively schematic sectional views of main portions of the three-dimensional solid knit fabric, showing applied examples of a pile portion.
Figure 21:
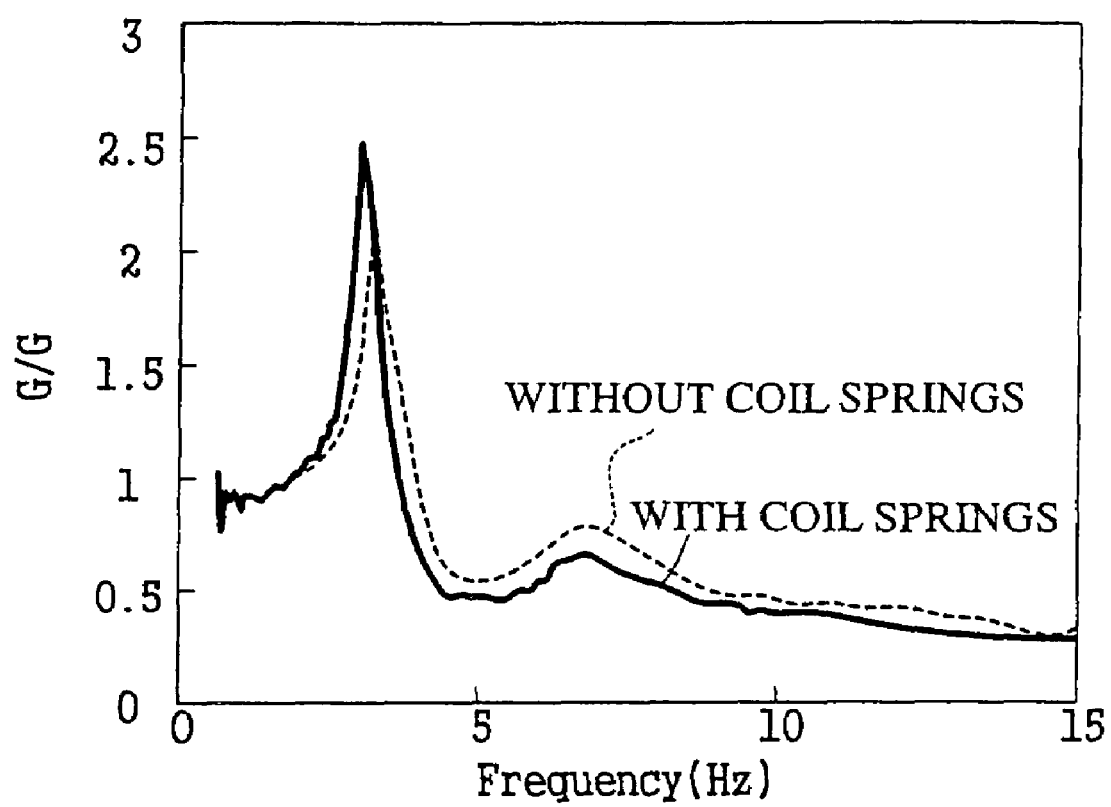
FIG. 21 is a graph showing vibration transmitting characteristics from a portion around an ischial tuberosity to a seated person.

For the one ground knit fabric 112, for example, as shown in FIG. 18, there is used a structure which forms a mesh by a flat, knit fabric weave which is continuous in both the wale direction and the course direction, from threads 120 in which short fibers are twisted. Further, the other ground knit fabric 114 forms a honeycomb-shaped mesh from threads 122 in which short fibers are twisted. Moreover, the other ground knit fabric 114 is a mesh which is larger than the one ground knit fabric 112. Note that the ground knit fabrics 112, 114 are not limited to a fine weave or a honeycomb shape, and may be structures using mesh-like knit fabric weaves other than these.

As shown in FIG. 17, the connecting threads 116 form the pile portion 118 by being knit-in between the ground knit fabrics 112, 114 so as to hold the one ground knit fabric 112 and the other ground knit fabric 114 at a predetermined interval. In this way, a predetermined rigidity is imparted to the three-dimensional solid knit fabric 110 which is a mesh knit.

The three-dimensional solid knit fabric 110 can provide the required stiffness in accordance with the thickness and the like of the ground threads (the threads 120, 122) which form the ground knit fabrics 112, 114, but it is preferable that the ground threads 120, 122 be selected from those in a range in which the knitting work is not difficult. Further, monofilament threads can be used as the ground threads 122, 122, but in consideration of the touch and the softness of the feel of the surface and the like, multifilament threads or spun threads may be used.

As the connecting threads 116, it is preferable to use monofilament threads, and those whose thickness is in a range of 167 decitex to 1110 decitex are preferable. With multifilament threads it is not possible to obtain a cushionability that has a good restoring force. Further, when the thickness is less than 167 decitex, the stiffness of the three-dimensional solid knit fabric 110 is low, and when the thickness is greater than 1110 decitex, it becomes too hard, and the proper amount of cushionability cannot be obtained.

Namely, by using monofilament threads of 167 decitex to 1110 decitex as the connecting threads 116, the load of the vehicle occupant seated on the seat can be supported by the deformation of the meshes forming the ground knit fabrics 112, 114, and the deformation due to the collapsing or buckling of the connecting threads 116 forming the pile portion 118, and the restoring force of the adjacent connecting threads which impart a spring characteristic to the deformed connecting threads 116, and it is possible to form a soft structure which has a soft spring characteristic and in which concentration of stress does not occur.

Note that recesses and protrusions may be formed at the three-dimensional solid knit fabric 110. Namely, the ground knit fabrics 112, 114 may be fabrics which are knit such that recesses and projections arise at the surfaces thereof. When recesses and projections are formed, spring elements which are substantially arch-shaped in cross-section can be formed at the ground knit fabrics 112, 114, and therefore, an even softer spring characteristic can be imparted, and a structure having elastic compliance which is substantially equivalent to or greater than the elastic compliance of muscles can be easily formed. Note that the elastic compliance is calculated by (flexing amount)/(average pressure value of surface of contact).

The raw materials of the ground threads 120, 122 and the connecting threads 116 are not particularly limited, and may be, for example, synthetic fibers or regenerated fibers such as polypropylene, polyester, polyamide, polyacrylonitrile, rayon, or the like, or natural fibers such as wool, silk, cotton, or the like. These raw materials may be used singly, or may be used together in an arbitrary combination. They are preferably a thermoplastic polyester type fiber exemplified by polyethylene terephthalate (PET), polybutylene terephthalate (PBT) and the like, or a polyolefin type fiber exemplified by nylon 6, nylon 66 and the like, or a fiber combining two or more types of these fibers.

Further, the thread shapes of the ground threads 120, 122 and the connecting threads 116 also are not limited to the above description, and threads of round cross-sections or threads of irregularly-shaped cross-sections or the like may be used.

The pile weave of the pile portion 118, which is the way of arranging the connecting threads 116 forming the pile portion 118, can be classified into the types shown in FIG. 20A through FIG. 20E, when expressed in the state of viewing, from the side surface, the connecting threads 116 which connect the respective ground knit fabrics 112, 114.

FIG. 20A and FIG. 20B are straight types in which the connecting threads 116 are knit-in substantially perpendicularly between the ground knit fabrics 112, 114. Thereamong, FIG. 20A is a structure which is knit straight in figure-eights. FIG. 20B is a structure which is knit simply straight.

Further, FIG. 20C, FIG. 20D, and FIG. 20E show cross types in which the connecting threads 116 are knit so as to intersect midway along, between the ground knit fabrics 112, 114. Thereamong, FIG. 20C is a structure in which the connecting threads 116 are crossed in figure-eights. FIG. 20D is a structure in which the connecting threads 116 are merely crossed. Further, FIG. 20E is a structure in which the connecting threads 116 are gathered together two-by-two and crossed (double-crossed).

Note that, as shown in FIG. 20C through FIG. 20E, when the connecting threads 116 intersect one another and are disposed obliquely, as compared with forms (see FIG. 20A, FIG. 20B) in which the connecting threads 116 are disposed substantially perpendicularly between the ground knit fabrics 112, 114, there is the advantage that a soft spring characteristic having a large compression rate can be imparted while maintaining sufficient restoring force by the buckling strength of the respective connecting threads 116.

At the upper cushion members 86, 102 using the three-dimensional solid knit fabric 110 having such a mesh structure, the spring property is small, the damping ratio is high, deformation following the physique of the vehicle occupant occurs easily, and it is easier to fit.

Note that the above-described structures of the three-dimensional solid knit fabric 110 are examples, and, for example, three-dimensional solid knit fabrics having various types of stitch structures, such as, for example, stitch structures in which convex portions or concave portions, or ribs or the like are formed in the surface, or the like, can be used at the upper cushion members 86, 102 and the lower cushion member 94. Further, three-dimensional solid knit fabrics of different stitch structures may be used in accordance with the application and the function. Accordingly, for example, the three-dimensional solid knit fabrics 110 of different stitch structures may be employed at the lower cushion member 94 and the upper cushion member 102. Or, instead of the structure in which the upper cushion member 86 is provided with the surface skin 88, the three-dimensional solid knit fabric 110, which has a stitch structure in which the top plate portion 86A and the bank portions 86B are difficult to elongate as compared with the intermediate portions 86C, may be used.

Next, operation of the present embodiment will be described.

In the vehicle seat 10 having the above-described structure, when a person sits down, at the seat cushion 20, the seated person who has entered-in between the bank portions 86B is supported by appropriate supporting pressure from the buttocks to the femoral regions. At the seat back 24, the seated person who has entered-in between the side support portions 102B is supported by appropriate supporting pressure from the buttocks to the shoulder blades.

Concretely, at the seat cushion 20 which is the sitting portion, due to the sitting, the surface skin 88, upper cushion member 86, and cloth spring material 68, which are layered, respectively flex downward. At this time, due to the upper cushion member 86 mainly elongating in the left-right direction while the intermediate portions 86C regulate the amount of elongation by the surface skin 88, the upper cushion member 86 flexes downward while maintaining the planar rigidity of the top plate portion 86A.

Further, the maximum elongation in the left-right direction of the upper cushion member 86 arises at a position, in the front-rear direction, corresponding to the positions Z beneath the ischial tuberosities of the seated person which is the maximum width portion of the intermediate portions 86C. Therefore, in vicinities of the portions corresponding to beneath the ischial tuberosities, the upper cushion member 86 attempts to flex downward greatly.

On the other hand, when the cloth spring material 68 flexes downward, due to the tension which is added to the cloth spring material 68 accompanying this flexing (based on the sitting load), the connecting pipe 50 of the movable frame portion 42 is pulled forward. At this time, the movable frame portion 42 rotates the arm members 44, 46 while twisting the torsion bar 62.

In this way, the connecting pipe 50, i.e., the rear end portion of the cloth spring material 68, moves forward. The cloth spring material 68 flexes downward greatly while urging force, which is based on the torsional load of the torsion bar 62, is applied to the left-right direction central portion as front-rear direction tension which is adjusted in the direction of decreasing. Accordingly, although the cloth spring material 68 is a thin structure, it gives the seated person the impression of a good flexing sensation (stroke sensation). In particular, together with the upper cushion member 86 elongating greatly toward the left and right in vicinities of beneath the ischial tuberosities, a good flexing sensation (stroke sensation), which did not exist conventionally, is obtained.

At this time, as the rear end portion of the cloth spring material 68, i.e., the spring hanging member 74, moves forward, the extension coil springs 78 are pulled, and the urging forces of the extension coil springs 78 increase the front-rear direction tension at the outer sides of the pelvis. On the other hand, at this time, as the spring hanging member 74 moves forward, the extension coil springs 80 are pulled, and the directions of tension of the cloth spring material 68 are in three dimensions.

Further, the urging forces of the extension coil springs 80 are applied to the cloth spring material 68 via the spring hanging member 74 and the bag-shaped material 76. Among the urging forces of the extension coil springs 80, mainly the rearward-acting components (components of force) pull the cloth spring material 68 rearward and make the partial tensions in the directions of arrow E and arrow F in FIG. 8 act on the cloth spring material 68. For these reasons, at the cloth spring material 68, the planar rigidity from the buttocks to the femoral regions of the seated person (the portions corresponding to the regions A in FIG. 9) becomes high.

On the other hand, among the urging forces of the extension coil springs 80, mainly the downwardly-acting components (components of force) pull the cloth spring material 68 downward. In this way, the cloth spring material 68 is a structure which is equivalent to applying elastic force based on a negative spring constant, to the positions of the cloth spring material 68 connected to the extension coil springs 80 (the region where the spring hanging member 74 and the bag-shaped material 76 are set). Accordingly, the longitudinal spring constant in vicinities of these connected positions becomes small. Thus, the planar rigidity at the region C becomes lower than the planar rigidity at the regions A.

Further, the cloth spring material 68 is pulled rearward and downward by the extension coil springs 80, and the position where the maximum downward flexing thereof arises moves rearward. Further, at this time, at the front portion of the seat cushion 20, due to the cloth spring material 68 compressing the compression coil springs 84 via the pushing plate 82, the cloth spring material 68 is pushed upward from below by the pushing plate 82 on the basis of the urging forces of the compression coil springs 84. In this way, in front of the buttocks of the seated person, the planar rigidity of the cloth spring material 68 becomes high.

As described above, at the seat cushion 20 (the cushion material 18), accompanying the sitting, tension adjustment, mainly in the left-right direction, of the upper cushion member 86, and tension adjustment, mainly in the front-rear direction, of the cloth spring material 68, are achieved. By the tension fields generated as a result thereof, the preferable planar rigidity arrangement shown in FIG. 9 is realized, and the dam S is formed at the preferable position slightly (substantially 30 mm in the present embodiment) forward of the positions Z beneath the ischial tuberosities.

Forward sliding of the seated person is prevented or suppressed by the dam S. Further, due to the seated person being supported from the buttocks to the femoral regions at the regions A which are high rigidity surfaces, front-rear and left-right movement of that seated person is suppressed. For these reasons, at the vehicle seat 10, forward sliding and the hammock sensation, which is the phenomenon that the seated posture is unstable, are cancelled. On the other hand, because the region D and the region C, which are other than the regions A, are low rigidity surfaces, the shearing forces applied to the muscles at the portions of the seated person supported at that region D and region C are reduced, and compression of the blood vessels is suppressed. In particular, the shearing force which is applied to the muscles around beneath the ischial tuberosities, which are supported by the region C and at which the body weight of the seated person concentrates, is reduced, and compression of the blood vessels is suppressed.

Therefore, for example, even in the case of driving for a long time period or the like, interruption in blood circulation, such as numbness or pain or the like, at around beneath the ischial tuberosities (convex portions) of the seated person is reduced (suppressed) or prevented.

In this way, in the vehicle seat 10 relating to the present embodiment, at the seat cushion 20, the seated posture can be stabilized while pain and numbness of the seated person are mitigated.

Namely, because the torsion bar 62 and the movable frame portion 42 allow forward movement of the rear end of the cloth spring material 68 while adjusting the tension of the cloth spring material 68 in the decreasing direction, the tension (planar rigidity) around the sacral bone of the seated person is reduced and the fitting sensation is improved. Further, due to this reduction in tension, as described above, pain and numbness around the ischial tuberosities is reduced. Further, due to this reduction in tension, the absorbability of the impact vibrations and the vibrations of the entire body of the seated person, which are due to top-bottom direction vibrations at the seat cushion 20, is improved. Moreover, due to the extension coil springs 80 which pull the cloth spring material 68 downward, the supporting pressure around the pelvis is in the normal line direction. Therefore, the shearing force applied to the muscles of the seated person is reduced, and the seated person is given the impression of a sensation of being uniformly supported, and dispersion of the body pressure (supporting pressure) is aimed for. In addition, due to the extension coil springs 78 which pull the cloth spring material 68 rearward, the portions which support the femoral regions of the seated person are high tension, and therefore, the seated person is given the impression of a continuous sensation of the supporting pressure, and the unsteady sensation (the so-called hammock sensation phenomenon) of that seated person is suppressed. Moreover, due to these tension adjustments being applied relatively, as described above, the cloth spring material 68 is supported by tensions in directions of three dimensions, and the planar rigidity arrangement of FIG. 9 is realized. In this way, the compliance of the seat cushion 20 conforms to the compliance of the seated person, and the stabilization of the seated posture and the mitigation of pain or the like of the seated person can both be achieved.

Further, at the seat cushion 20, as described above, because the longitudinal spring constant of the region C is reduced, not only the force applied to the human body, but also the rate of change of this force jerking) is reduced. In this way, the absorbability of vibrations is improved even more, and the comfort of the ride improves. Namely, the top-bottom direction resonance frequency (natural frequency) of the seat cushion 20, which is determined mainly by the aforementioned longitudinal spring constant and the body weight of the seated person, becomes low. Therefore, as shown by the vibration transmitting characteristic graph in FIG. 21, as compared with a case in which the extension coil springs 80 are not provided, the high frequency vibrations which are transmitted to the seated person (the input amplitude), and vibrations in the region of 5 Hz or more in particular, markedly decrease, and the comfort of the ride in the high frequency vibration region is greatly improved.

Moreover, at the seat cushion 20, as described above, because a difference in surface rigidities (a difference in tensions) is provided at the region A and at the regions B, C, at the time of sitting, a good stroke sensation which did not exist conventionally is created. In particular, due to the combination of the extension coil springs 80 and the movable frame portion 42 which rotates while twisting the torsion bar 62 (and while pulling the extension coil springs 78), a good flexing sensation based on a sufficient seating stroke is realized while aiming to make the seat cushion 20 thinner (more compact and light-weight).

On the other hand, at the seat back 24, due to the sitting, the surface skin 106, upper cushion member 102, and lower cushion member 94, which are layered, respectively flex substantially rearward. At this time, due to the upper cushion member 102 elongating mainly in the left-right direction while the intermediate portions 102C thereof regulate the amount of elongation by the surface skin 106, the upper cushion member 102 flexes substantially rearward while maintaining the planar rigidity of the back rest 102A.

Further, when the lower cushion member 94 flexes substantially rearward, the planar rigidity becomes high at the portions of the lower cushion member 94 which correspond to the portion at the lower side of the shoulder blades and the lumbar vertebrae region (hips) which are connected to the wires 92 for fixing via the fixing members 96. Further, at the portions which correspond to the shoulder blades and the buttocks which are connected to the wires 92 for fixing via the extension coil springs 98, a negative spring constant is applied and the planar rigidity becomes low. Namely, the directions of tension of the lower cushion member 94 are in three dimensions.

In this way, at the seat back 24 (the cushion material 22), accompanying the sitting, tension adjustment, mainly in the left-right direction, of the upper cushion member 102, and tension adjustment, in the top-bottom and front-rear directions, of the lower cushion member 94, are achieved, and by supporting the portion of the seated person from the hips to the lower side of the shoulder blades by a high rigidity surface, left and right movement of the seated person is suppressed. In this way, at the vehicle seat 10, at the seat back 24 as well, the hammock sensation, which is a phenomenon in which the seated posture is unstable, is cancelled. On the other hand, because the buttocks and the shoulder blades, which are regions which project further than the hips of the seated person, are supported by low rigidity surfaces, the shearing forces applied to the muscles around the buttocks and the shoulder blades are reduced, and compression of blood vessels is suppressed. Therefore, for example, even in the case of driving for a long time period or the like, interruption in blood circulation, such as numbness or pain or the like, at around the buttocks and the shoulder blades of the seated person is reduced (suppressed) or prevented.

In this way, in the vehicle seat 10 relating to the present embodiment, at the seat back 24 as well, the seated posture can be stabilized while pain and numbness of the seated person are mitigated. Namely, the compliance of the seat back 24 conforms to the compliance of the seated person, and stabilization of the seated posture and mitigation of pain and the like of the seated person can both be achieved.

As described above, in the vehicle seat 10 which is provided with the cushion materials 18, 22 which are structured so as to include the upper cushion members 86, 102 which are the three-dimensional tension knit fabrics 110 which are stretched at the frame 14 for the sitting portion and the frame 16 for the back portion of the seat frame 12 respectively, by providing an elastic supporting structure or a tension adjusting mechanism, an arbitrary planar rigidity arrangement (portions having different spring constants in the direction of pushing by the seated person) can be set at the seat cushion 20 and the seat back 24. Namely, by making the directions of tension of the cloth spring material 68 and the lower cushion member 94 be in three dimensions by the elastic supporting structure or the tension adjusting mechanism, the compliances of the seat cushion 20 and the seat back 24 can be set so as to conform to the compliance of the seated person.

Further, this tension adjusting mechanism is structured by the cloth spring material 68 and the lower cushion member 94 structuring the cushion materials 18, 22 respectively, and the extension coil springs 80, 98, the bag-shaped material 76, and the fixing members 96 serving as connecting members. Further, the elastic supporting structure is structured by the movable frame portion 42 and the torsion bar 62, and the extension coil springs 78, 80, 98 serving as first through third elastic members. Therefore, the desired rigid surface arrangement, which corresponds to the hip points, the seating angle, the design shape, the supposed physique of the seated person, and the like, can be easily obtained by (changing) the settings such as the characteristics and the connection positions, the arrangements, the provided number, and the like of these connecting members and elastic members. Therefore, in the vehicle seat 10 having the above-described structure, the seat development cost can be greatly reduced as compared with a conventional urethane seat. Namely, in a conventional urethane seat, because the rigid surface arrangement is set in accordance with the shape of the urethane or the combination of urethanes having different characteristics, there is the need to change the urethane mold and to examine (test) the planar rigidity arrangement (characteristics) in order to obtain the needed rigid surface arrangement. In contrast, in the vehicle seat 10, as described above, the desired rigid surface arrangement can be easily obtained in accordance with the settings of the characteristics and the connection positions, the arrangements, the provided number, and the like of the connecting members.

Moreover, in the vehicle seat 10, the directions of adjusting the tension are made to be different at the cloth spring material 68 and the lower cushion member 94 which are the lower layer portions of the cushion materials 18, 22, and at the upper cushion members 86, 102 which are the surface layer portions. Therefore, a good planar rigidity arrangement can be obtained by the generated tension fields thereof. Further, in the seat cushion 20 of the present embodiment, the preferable planar rigidity arrangement shown in FIG. 9 is realized.

In addition, the upper cushion members 86, 102 realize the function of adjusting the tension in the left-right direction, by the simple structure of merely providing the intermediate portions 86C, 102C which elongate easily in the left-right direction. In particular, by the simple structure of continuously varying the left-right direction widths of the intermediate portions 86C, 102C, setting (adjustment) of the tension fields, i.e., the planar rigidity arrangement, is possible, and this structure contributes to cost reduction and a further decrease in the development costs.

Next, a seat cushion 130 relating to a modified example of the present embodiment will be described on the basis of FIG. 22 through FIG. 24. Note that the same reference numerals as in the above-described embodiment are applied to parts and portions which are basically the same as the above-described embodiment, and description thereof will be omitted.

Figure 22:
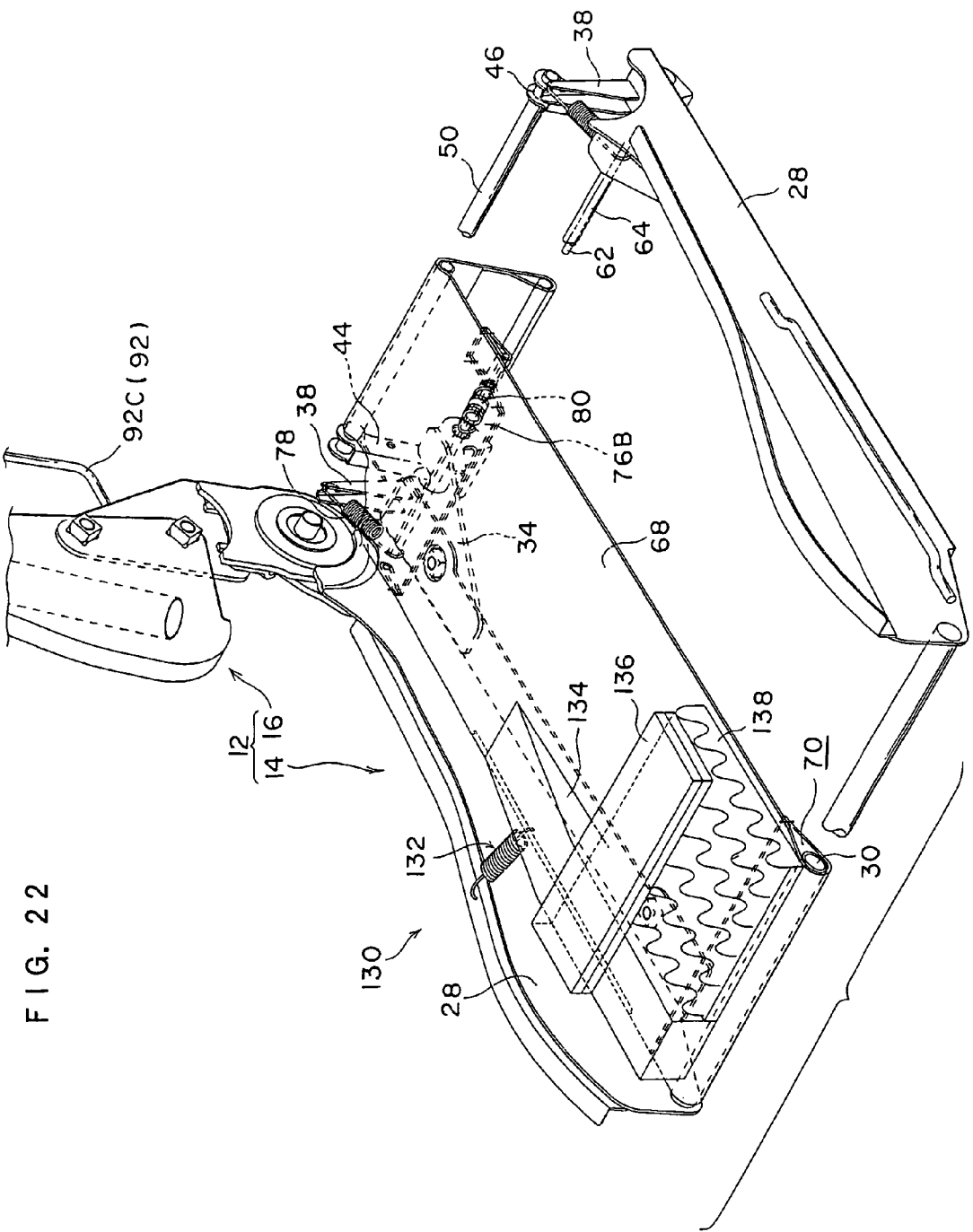
FIG. 22 is a perspective view corresponding to FIG. 3 and showing a modified example of the seat cushion of the vehicle seat relating to the embodiment of the present invention.
Figure 23:
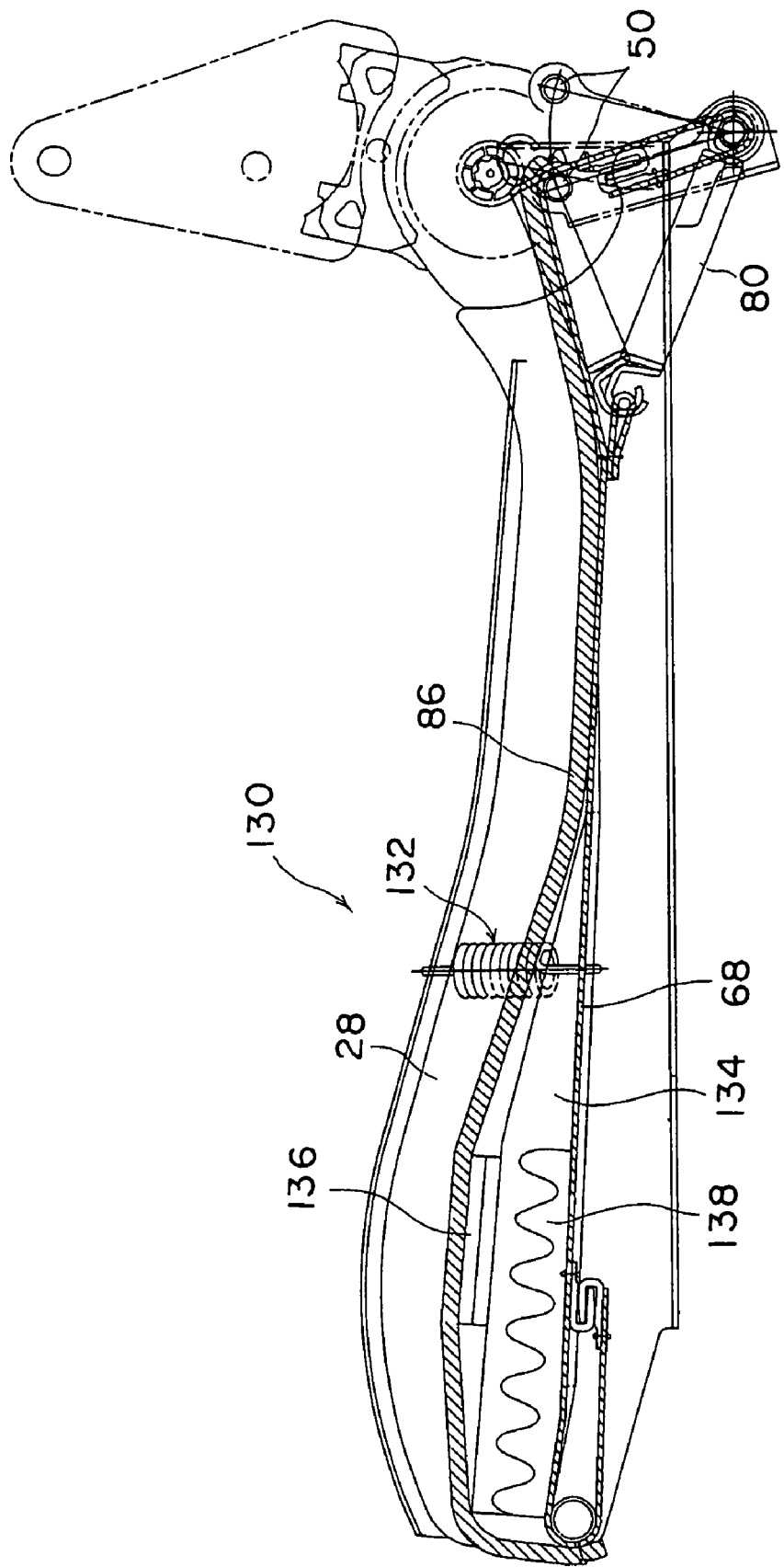
FIG. 23 is a side view corresponding to FIG. 7 and showing the modified example of the seat cushion of the vehicle seat relating to the embodiment of the present invention.
Figure 24:
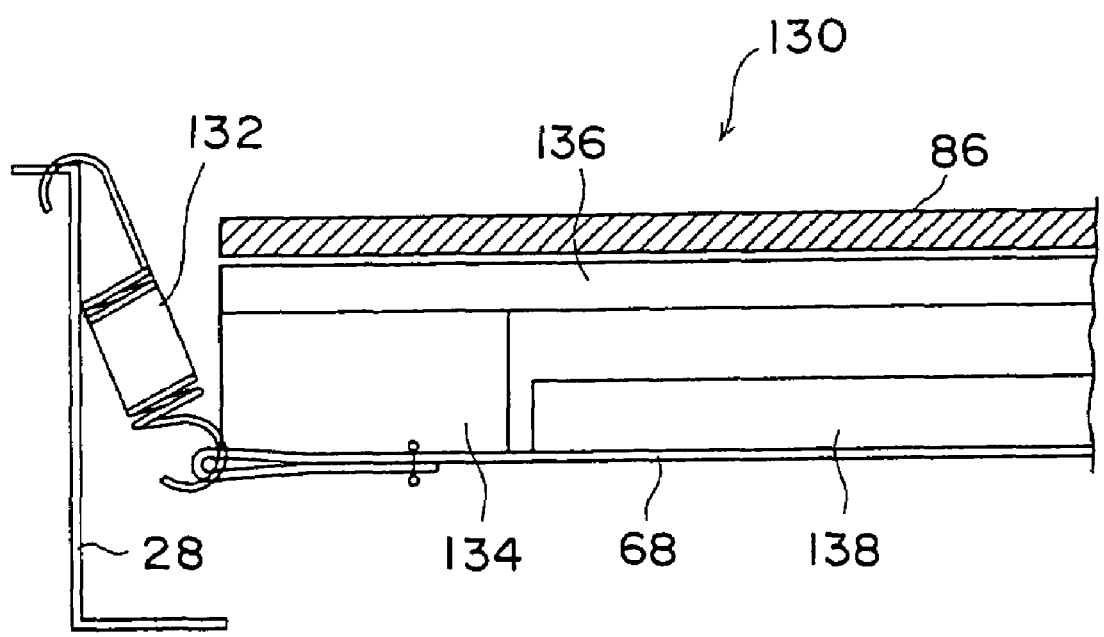
FIG. 24 is a front sectional view of a left-right direction half, showing the modified example of the seat cushion of the vehicle seat relating to the embodiment of the present invention.

As shown in FIG. 22 and FIG. 23, the seat cushion 130 differs from the seat cushion 20 with respect to the point that the seat cushion 130 does not have the pushing plate 82 and the compression coil springs 84. Further, at the seat cushion 130, the other end portions of extension coil springs 132, whose respective one end portions are anchored on the side frames 28, are anchored at the left-right directions both end portions of the cloth spring material 68 slightly forward of the central portion in the front-rear and left-right directions. At the time of sitting, the cloth spring material 68 is pulled upward by the extension coil springs 132.

Further, stand members 134 are respectively placed at the front side of the central portion in the front-rear and left-right directions, at the left-right direction both end portions of the cloth spring material 68. The stand members 134 are formed in trapezoidal shapes as seen in side view, and are disposed such that inclined portions thereof straddle the anchor portions of the extension coil springs 132. Moreover, a pushing plate 136 spans above the left and right stand members 134. In this way, the pushing plate 136 is a structure which easily flexurally deforms downward at the central portion in the left-right direction.

Moreover, an intermediate cushion member 138, which is formed from polyurethane foam, is placed at the portion of the cloth spring material 68 from the front end portion thereof to the rear end portion of the pushing plate 136. The height of the intermediate cushion member 138 is lower than the front half portion on the stand member 134, and the intermediate cushion member 138 is disposed so as to not contact the pushing plate 136 at the time of not sitting (see FIG. 24). Further, when the pushing plate 136 flexes accompanying sitting, the pushing plate 136 pushes the upper cushion member 86 from below, due to urging force based on the elastic deformation of the intermediate cushion member 138, and the restoring force of the pushing plate 136 itself.

Note that, at the front portion, the upper cushion member 86 is layered on the stand members 134 and the pushing plate 136, and at the high portion, the upper cushion member 86 is layered directly on the cloth spring material 68. Further, the rear end portion of the cloth spring material 68 is trained around the connecting pipe 50 and anchored on the protective pipe 64.

In the structure relating to the present modified example, due to the extension coil springs 132 pulling the cloth spring material 68 upward at the time of sitting, the region where the maximum flexing is generated at the cloth spring material 68 can be set to be around beneath the ischial tuberosities. Moreover, in the sacral bone seated posture, due to changes in the seating angle of the cloth spring material 68, rotation of the pelvis is prevented and the seated posture can be stabilized even more. In addition, the inclined portions of the stand members 134 correspond to the portions of the femoral regions where the muscles are insensitive, and the supporting of these insensitive regions from in front of beneath the ischial tuberosities lessens the sensation that a foreign object exists due to the frame pipe 30 which is the fixed end of the seat cushion 130 front end. On the other hand, due to the active supporting of the front portions of the thighs by the pushing plate 136 and the intermediate cushion member 138, the body pressure is reduced, the seated person is given the impression of a sensation of uniform and continuous support of the femoral regions, and an odd feeling due to differences in physiques or the posture is absorbed. The other effects are exactly similar to the seat cushion 20, except for the effects due to the pushing plate 82 and the compression coil springs 84.

Note that the above-described embodiment and modified example are preferable structures in which partial tension (initial tension) is added to the cloth spring material 68 by the extension coil springs 80. However, the present invention is not limited to this. For example, it may be a structure in which partial tension (initial tension) is added at the time of sitting or before sitting, due to a highly-rigid net material (a three-dimensional solid knit fabric or the like) or the like being layered on and sewn to the portions, corresponding to the regions A, of the cloth spring material 68 or the upper cushion member 86. In a structure in which initial tension is added to the upper cushion member 86 by a high rigidity net material or the like, it is also possible to form a structure which does not have the cloth spring material 68. Further, the seat back 24 as well can be structured similarly.

Further, the above-described embodiment and modified example are preferable structures in which both the seat cushion 20 and the seat back 24 have the cushion materials 18, 22 which include the three-dimensional solid knit fabric 110, but the present invention is not limited to this. For example, it suffices for the seat cushion 20 and the seat back 24 to be structured such that only either one of the cushion materials 18, 22 includes the three-dimensional solid knit fabric 110 which is stretched at the seat frame 12.

Moreover, the above-described embodiment and modified example are structured such that the compression coil springs 84 or the extension coil springs 132, which are urging members which urge the cushion material 18 (the cloth spring material 68) toward the side opposite to the pushing direction by the human body, are provided only at the seat cushion 20, but the present invention is not limited to this. For example, urging members corresponding to the compression coil springs 84 or the extension coil springs 132 may be provided at the seat back 24.

In addition, the above-described embodiment and modified example are structures which apply to the present invention to the vehicle seat 10, but the present invention is not limited to this. The present invention can be applied to various types of seats such as, for example, seats for means of transport such as trains, ships, airplanes, and the like, or chairs for offices, chairs for furniture, or the like.

INDUSTRIAL APPLICABILITY

As described above, the seat relating to the present invention is used when the seating comfort is to be improved.

The invention claimed is:
1. A seat comprising:
 a sitting portion frame;
 a cushion material including a lower layer portion stretched in a front-rear direction on the sitting portion frame, and a surface layer portion layered on the lower layer portion and stretched on the sitting portion frame;
 and
 a tension adjusting mechanism that connects connection positions of the lower layer portion in to portions of the sitting frame that are lower than the connection positions, the connection positions being provided on the lower layer portion at locations corresponding to locations where ischial tuberosities of a person are located when the person is seated in the seat;

wherein:
the tension adjusting mechanism generates tensile force at a time when the person sits in the seat;
the surface layer portion includes portions between a central portion in a left-right direction which support the seated person and both end portions in the left-right direction, and which elongate in a left-right direction more easily than the central portion and the both end portions; and
the portions between the central portion in the left-right direction and both end portions in the left-right direction include elastic members which elongate more easily than the central portion and the both end portions.

2. The seat of claim 1, wherein the elastic members include a three-dimensional solid knit fabric.

3. The seat of claim 1, wherein left-right direction widths of the elastic members vary continuously along a front-rear direction of the sitting portion frame or a top-bottom direction of the back portion frame.

4. A seat comprising:
a back portion frame;
a cushion material including a lower layer portion stretched on the back portion frame at a portion corresponding to a region between a lower side of shoulder blades and a lumbar vertebrae region of a seated person, and a surface layer portion layered on the lower layer portion and stretched on the back portion frame; and
a tension adjusting mechanism that connects at least one connection position of the lower layer portion that is located further upward than beneath the shoulder blades and a connection position further downward than the lumbar vertebrae region to the back portion frame;
wherein:
the tension adjusting mechanism generates tensile force which pulls the lower layer portion rearward at a time of sitting;
the surface layer portion includes portions between a central portion in a left-right direction which support the seated person and both end portions in the left-right direction, and which elongate in a left-right direction more easily than the central portion and the both end portions; and
the portions between the central portion in the left-right direction and both end portions in the left-right direction include elastic members which elongate more easily than the central portion and the both end portions.

5. The seat of claim 4, wherein the elastic members include a three-dimensional solid knit fabric.

6. The seat of claim 4, wherein left-right direction widths of the elastic members vary continuously along a front-rear direction of the sitting portion frame or a top-bottom direction of the back portion frame.

7. A seat comprising:
a seat frame that includes a fixed frame and a movable frame provided at a rear portion of the fixed frame, the movable frame being able to move in a front-rear direction;
a cushion material that includes a cloth spring material with a front end portion that is anchored at the fixed frame and a rear end portion that is anchored at the movable frame, and a surface layer portion layered on the cloth spring material and stretched on the fixed frame;
an urging member provided between the fixed frame and the movable frame, the urging member urging the movable frame rearward and adding tension to the cloth spring material at a time when a person sits in the seat; and
a tension adjusting mechanism that connects connection positions of the cloth spring material to portions of the fixed frame that are rearward and downward with respect to the connection positions;
the connection positions are provided on the cloth spring material at locations outward and rearward with respect to locations where ischial tuberosities of a person are located when the person is seated in the seat;
wherein:
the tension adjusting mechanism generates tensile force at the time when the person sits in the seat;
the surface layer portion includes portions between a central portion in a left-right direction which support the seated person and both end portions in the left-right direction, and which elongate in a left-right direction more easily than the central portion and the both end portions; and
the portions between the central portion in the left-right direction and both end portions in the left-right direction include elastic members which elongate more easily than the central portion and the both end portions.

8. The seat of claim 7, wherein the elastic members include a three-dimensional solid knit fabric.

9. The seat of claim 7, wherein left-right direction widths of the elastic members vary continuously along a front-rear direction of the sitting portion frame or a top-bottom direction of the back portion frame.

10. The seat of claim 7, wherein a pushing member, which pushes the cloth spring material from a lower side at the time of sitting, is provided further forward than a front-rear direction central portion of the cloth spring material.

11. The seat of claim 10, wherein the pushing member includes a pushing plate which is formed in a rectangular shape that includes a width of substantially 100 mm and that is disposed in a left-right direction of the seat and that includes a rear end portion that is positioned from 250 mm to 350 mm forward of the connection positions, and an elastic member which is provided between the pushing plate and the fixed frame.

12. A seat comprising:
a frame; and
a sheet of a cloth spring material;
wherein:
a front end portion of the sheet is attached along its length to a front portion of the frame;
a rear end portion of the sheet is attached along its length to a rear portion of the frame;
the front portion of the frame is provided so that the front portion of the frame and the front end portion of the sheet remain fixed in location when the seat is in use;
the rear portion of the frame comprises a connecting portion and a torsion bar, the connecting portion being rotatable about the torsion bar;
the rear end portion of the sheet is attached to the connecting portion so that the rear end portion of the sheet and the connecting portion rotate about the torsion bar against a torsional load of the torsion bar when the seat is in use; and
rotation of the connecting portion about the torsion bar causes the location of the rear end portion of the sheet to change both in an up-down direction and a front-rear direction in accordance with a pushing force applied to the sheet so that a planar orientation of the sheet changes.

13. The seat of claim 12, further comprising:
at least one first spring member connected to the frame and to the sheet;
wherein:
the at least one first spring member is attached to the rear portion of the frame at a location above the connecting portion, the location being fixed when the seat is in use;
the at least one first spring member is attached to the sheet at a location forward of the rear end portion of the sheet;
the at least one first spring member acts to resist movement of the rear end portion of the sheet toward the front portion of the frame when the seat is in use.

14. The seat of claim 13, wherein the at least one first spring member comprises at least two extension coil springs attached to the sheet at respective locations equidistant from a center line of the sheet in a left-right direction.

15. The seat of claim 12, further comprising:
at least one second spring member connected to the frame and to the sheet;
wherein:
the at least one second spring member is attached to the rear portion of the frame at a location below the connecting portion, the location being fixed when the seat is in use;
the at least one second spring member is attached to the sheet at a location forward of the rear end portion of the sheet;
the at least one second spring member acts to resist movement of the rear end portion of the sheet toward the front portion of the frame when the seat is in use.

16. The seat of claim 15, wherein the at least one second spring member comprises at least two extension coil springs attached to the sheet at respective locations equidistant from a center line of the sheet in a left-right direction.

17. The seat of claim 15, wherein the at least one second spring member comprises at least one extension coil spring.

18. The seat of claim 12, further comprising:
a plate member; and
at least one third spring member;
wherein:
the plate member extends along a width of the seat beneath the sheet at a location rearward of the front end portion of the sheet;
the at least one third spring member is connected to the frame and the plate member;
the at least one third spring member pushes the plate member into a bottom surface of the sheet when the seat is in use.

19. The seat of claim 18, wherein:
the plate member comprises a pushing plate having a substantially rectangular shape when viewed from above and having a major dimension provided in a left-right direction; and
the at least one third spring member comprises a plurality of compression coil springs attached to the plate member at uniform intervals in the left-right direction.

20. The seat of claim 12, further comprising:
at least one fourth spring member;
wherein:
the at least one fourth spring member is connected to a side edge portion of the sheet and a side portion of the frame;
the at least one fourth spring member acts to resist movement of the side edge portion of the sheet toward a portion of the frame opposite from the side portion of the frame when the seat is in use.

21. The seat of claim 12, further comprising:
a cushion member; and
a surface skin;
wherein:
the cushion member is provided over a top surface of the sheet;
the surface skin is provide over a top surface of the cushion member; and
the cushion member comprises a three dimensional solid knit fabric.

* * * * *

UNITED STATES PATENT AND TRADEMARK OFFICE
CERTIFICATE OF CORRECTION

PATENT NO.        : 7,731,294 B2
APPLICATION NO. : 10/526432
DATED              : June 8, 2010
INVENTOR(S)       : Eiichi Yasuda et al.

It is certified that error appears in the above-identified patent and that said Letters Patent is hereby corrected as shown below:

Column 38, Line 62, "positions of the lower layer portion in to portions of the" should read --positions of the lower layer portion to portions of the--

Signed and Sealed this

Twenty-first Day of December, 2010

David J. Kappos
*Director of the United States Patent and Trademark Office*